United States Patent
Vine et al.

(10) Patent No.: US 8,240,353 B2
(45) Date of Patent: Aug. 14, 2012

(54) GRIPPER ASSEMBLY FOR TRAY SEALING MACHINE

(75) Inventors: Lee Michael Vine, Poole (GB); David Morgan, Bournemouth (GB)

(73) Assignee: Ishida Europe Limited, Birmingham (GB)

( * ) Notice: Subject to any disclaimer, the term of this patent is extended or adjusted under 35 U.S.C. 154(b) by 753 days.

(21) Appl. No.: 12/225,240

(22) PCT Filed: Mar. 15, 2007

(86) PCT No.: PCT/GB2007/000911
§ 371 (c)(1),
(2), (4) Date: May 20, 2009

(87) PCT Pub. No.: WO2007/107703
PCT Pub. Date: Sep. 27, 2007

(65) Prior Publication Data
US 2009/0301658 A1    Dec. 10, 2009

(30) Foreign Application Priority Data
Mar. 17, 2006  (GB) .................................. 0605468.8

(51) Int. Cl.
*B32B 37/00* (2006.01)
(52) U.S. Cl. ...................... 156/581; 156/538; 156/583.1
(58) Field of Classification Search .................. 156/497, 156/499, 538, 556, 580, 581, 583.1
See application file for complete search history.

(56) References Cited

U.S. PATENT DOCUMENTS

| | | | |
|---|---|---|---|
| 2,776,742 A | 1/1957 | Langenberg | |
| 3,061,984 A | 11/1962 | Mahaffy | |
| 3,303,628 A | 2/1967 | Lovas et al. | |
| 3,693,318 A | 9/1972 | Balzer et al. | |
| 4,039,088 A | 8/1977 | Marynissen | |
| 4,167,092 A | 9/1979 | Medwed | |
| 4,282,699 A | 8/1981 | Embro, Jr. | |
| 4,862,671 A | 9/1989 | Lanoiselee et al. | |
| 6,550,219 B2 * | 4/2003 | Liao ............................. | 53/374.6 |
| 2002/0178691 A1 | 12/2002 | Liao | |

FOREIGN PATENT DOCUMENTS

| | | |
|---|---|---|
| DE | 2 038 309 | 2/1971 |
| DE | 29 13 026 | 10/1980 |
| DE | 30 11 627 A1 | 10/1981 |
| DE | 10 2004 05192 A1 | 5/2006 |
| EP | 1 013 552 A1 | 6/2000 |

(Continued)

OTHER PUBLICATIONS

International Search Report (Mailed Aug. 28, 2007 for International Application No. PCT/GB2007/000911).

*Primary Examiner* — James Sells

(57) ABSTRACT

A gripper assembly for a tray sealing machine. The gripper assembly includes a carriage movable between extended and retracted positions; at least one gripper arm attached to the carriage and movable between gripping and releasing positions; and first and second independently operable drives separate from the carriage but coupled thereto via respective first and second drive train assemblies. The first drive train assembly is adapted to move the carriage between the first and second positions in response to the operation of the first drive, and the second drive train assembly is further adapted to cause the at least one gripper arm to move between the open and closed positions in response to operation of the first and second drives at differing speeds.

11 Claims, 21 Drawing Sheets

FOREIGN PATENT DOCUMENTS

| | | |
|---|---|---|
| EP | 1 038 778 A1 | 9/2000 |
| EP | 1 228 853 A2 | 8/2002 |
| EP | 1 489 007 A1 | 12/2004 |
| EP | 1598273 A1 | 11/2005 |
| EP | 1 690 794 A1 | 8/2006 |
| FR | 2 513 964 | 4/1983 |
| FR | 2 882 727 | 9/2006 |
| GB | 1097044 | 12/1967 |
| WO | 00/47497 | 8/2000 |
| WO | 2007/049145 A1 | 5/2007 |

* cited by examiner

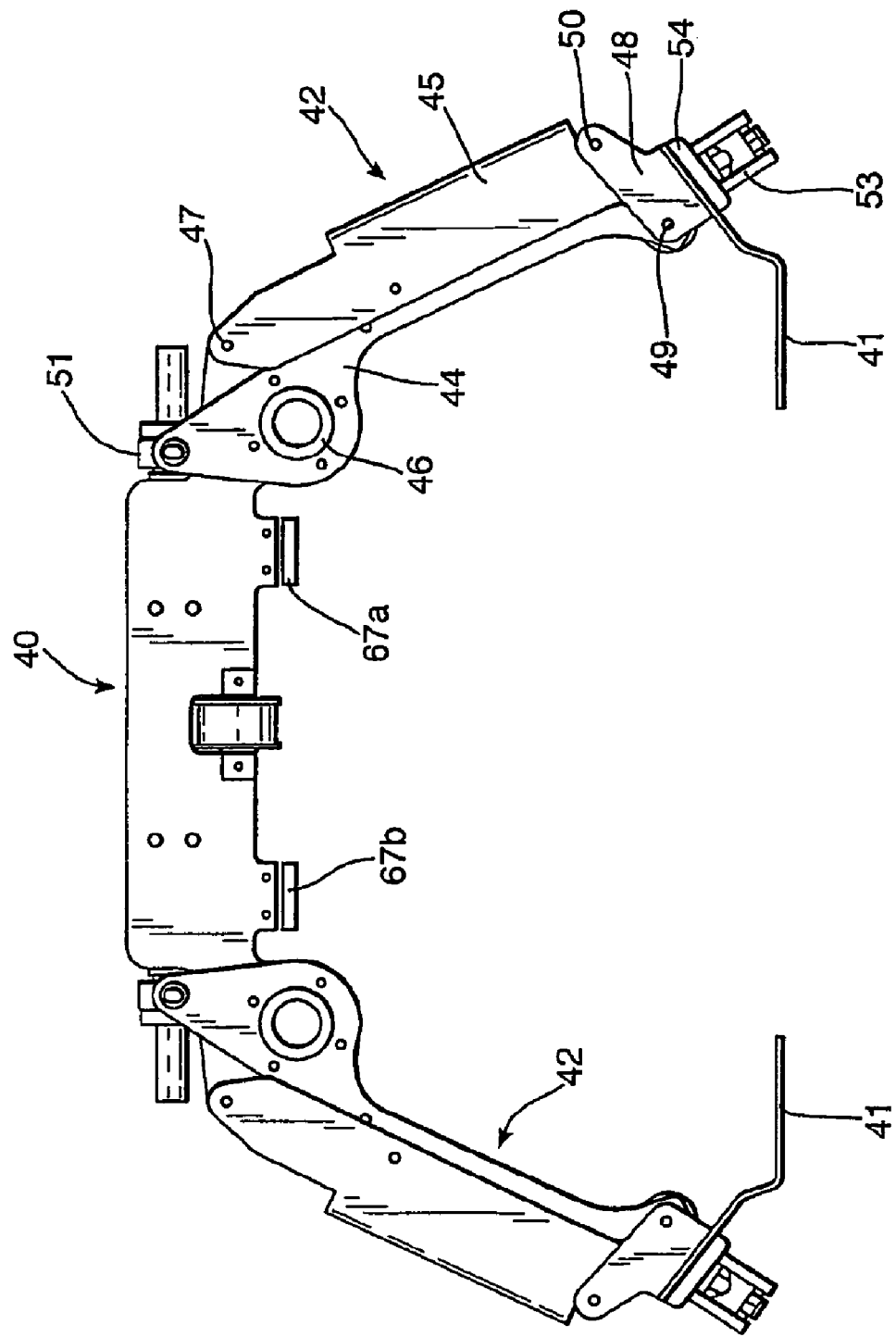

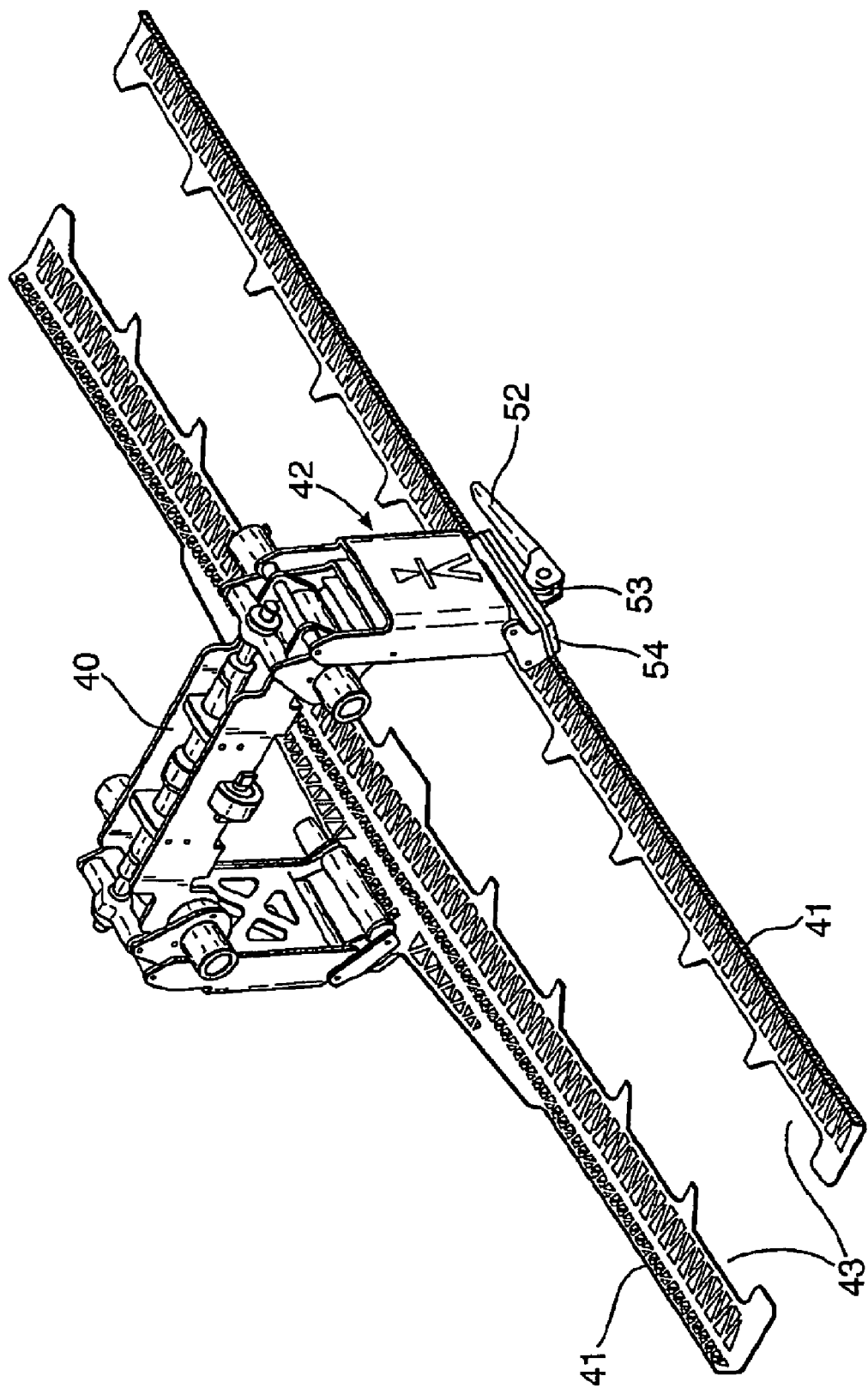

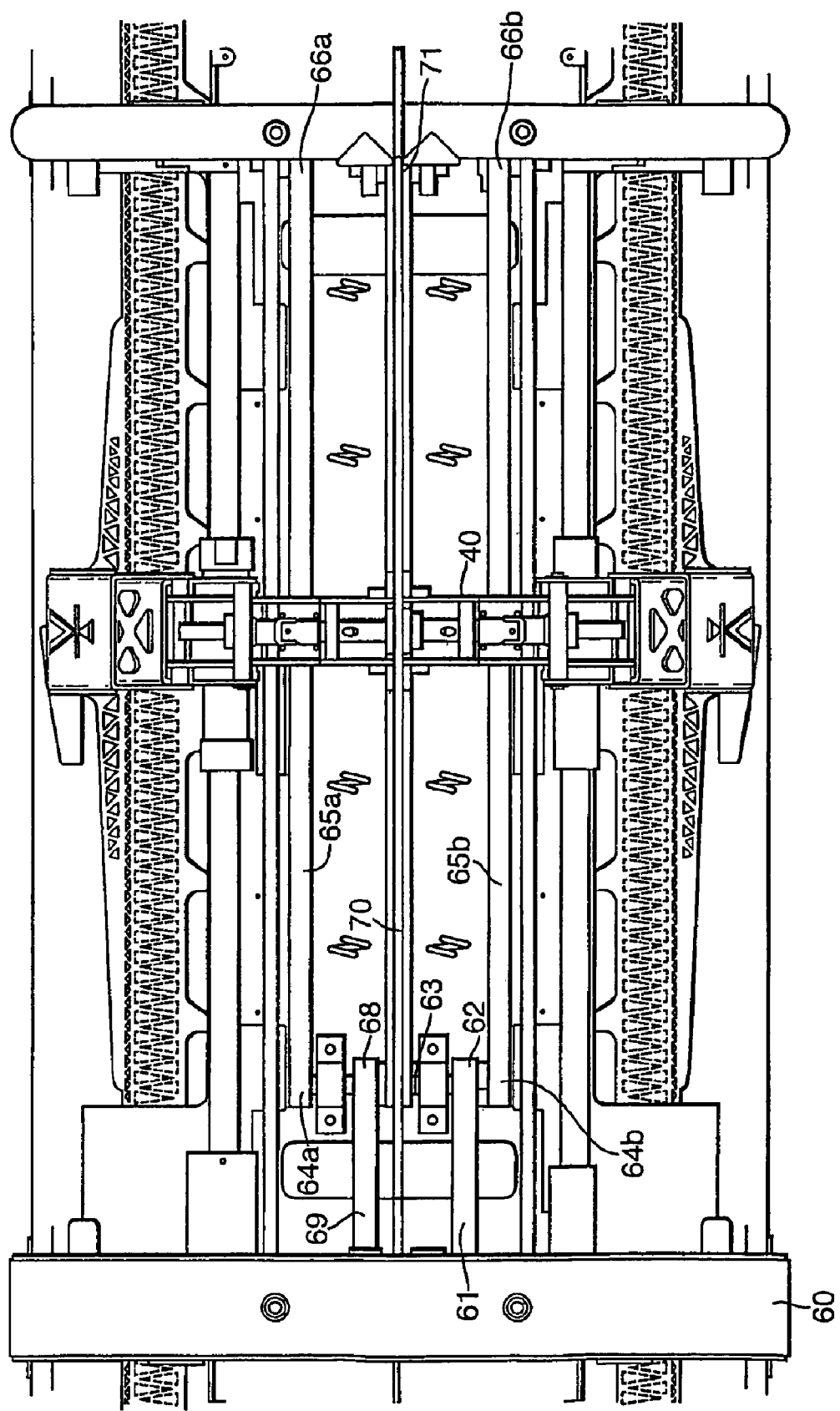

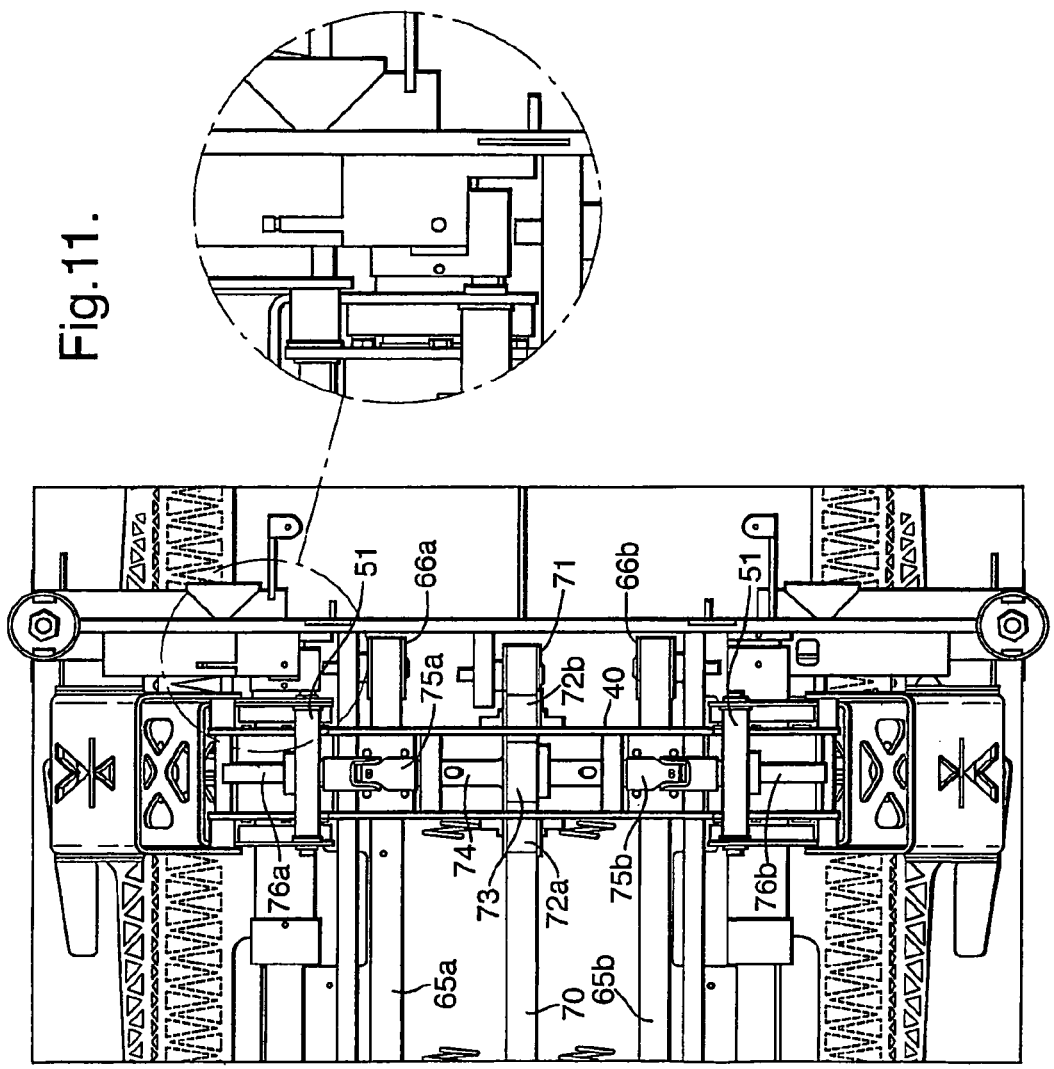

Fig.15.
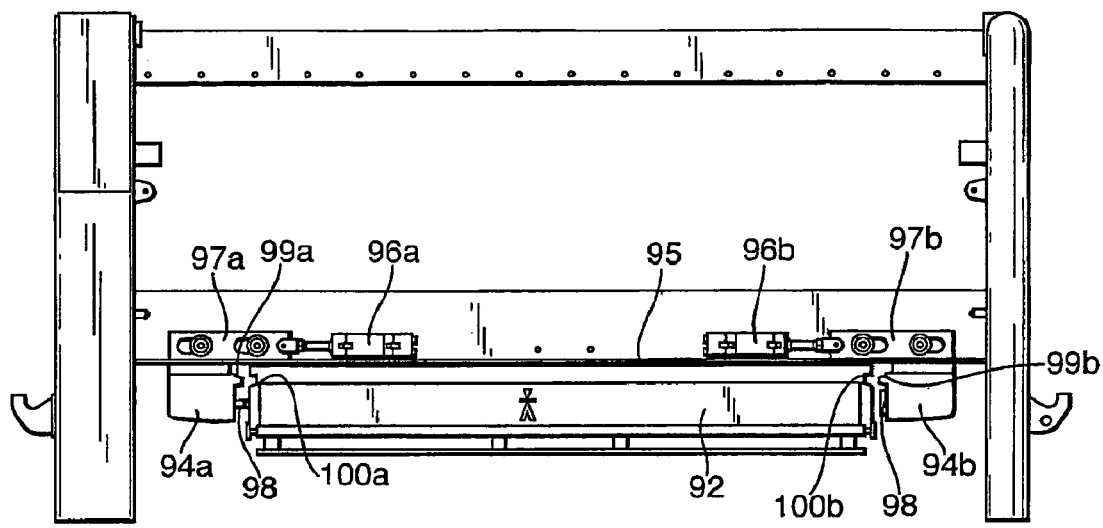
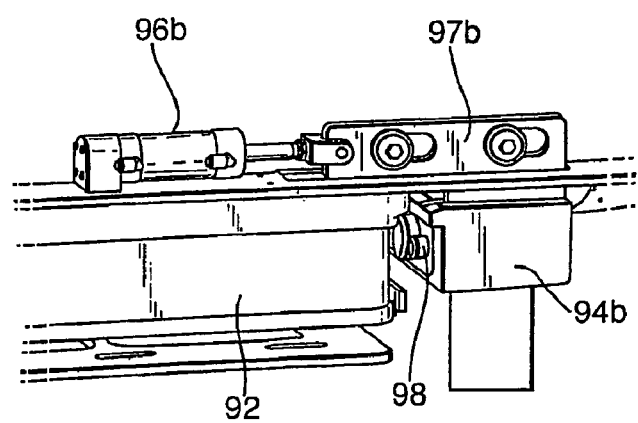

Fig.16.
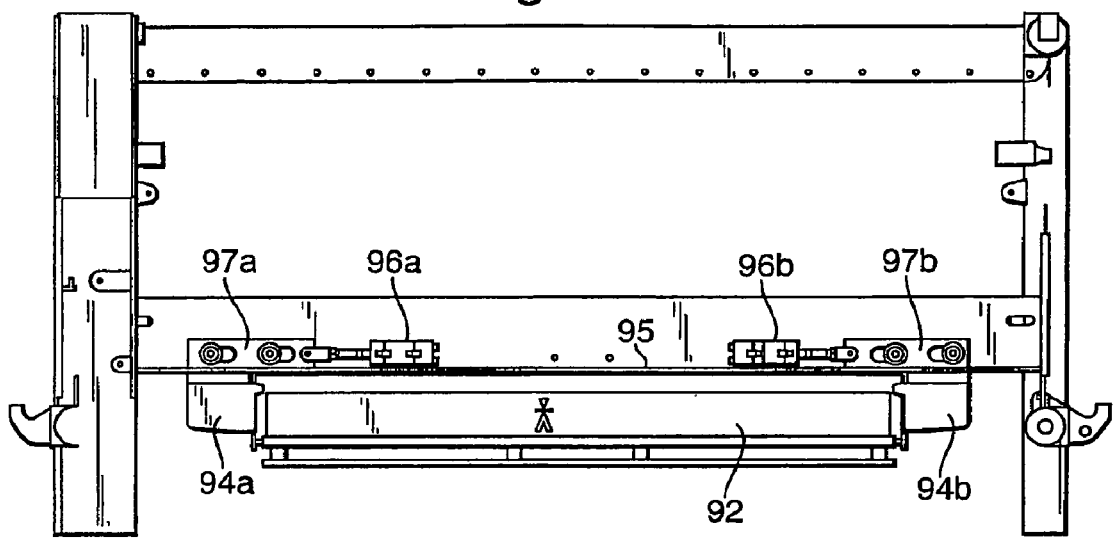
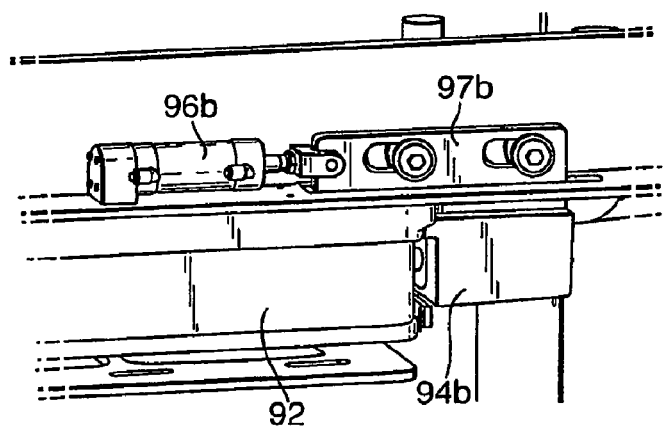

GRIPPER ASSEMBLY FOR TRAY SEALING MACHINE

This application claims the benefit under 35 U.S.C. Section 371, of PCT International Application No. PCT/GB2007/000911, filed Mar. 15, 2007, which claimed priority to UK Patent Application No. GB0605468.8, filed Mar. 17, 2006, in the UK Intellectual Property Office, the disclosures of which are hereby incorporated by reference.

This invention relates to various aspects of a tray sealing machine.

Conventional tray sealing machines receive plastic trays to be sealed on an infeed conveyor system, which collates the trays into groups. When a group of trays has been collated, the group is moved by a gripper system into a sealing station where a film lid is heat sealed to the plastic trays. The gripper system then moves the sealed trays to an outfeed conveyor system for further processing. An example of such a tray sealing machine is the Ishida Qualitech QX775.

However, there are various shortcomings with such conventional tray sealing machines.

Firstly, conventional gripper systems have a sliding carriage with one or more gripper arms suspended from it. The carriage slides between two positions, one in which the gripper arms can engage the trays on the infeed conveyor system and another in which the gripper arms release the trays for sealing. The gripper arms are typically actuated by a pneumatic cylinder or similar device mounted on the carriage. The air supply for such a pneumatic cylinder must move with the carriage, and this represents a weakness because the continuous cyclic strain on the air supply connections as the carriage moves between the two positions often leads to failure of the air supply.

A second shortcoming concerns the control of the sealing force that is applied to the trays during the sealing process. The force is applied by clamping the trays, along with the film which forms the lids, between two parts of a sealing tool, one of which heats the film and trays causing them to fuse together. The film is then cut around the periphery of each tray. The sealing tool is lifted with the trays loaded on to it into the sealing position. The sealing tool is very heavy (typically around 300 kg) and so a large force must be applied simply to overcome the inertia of the sealing tool. However, this force must be applied smoothly to ensure gentle handling of the trays, thereby avoiding product spillage. It must also be possible to raise and lower the sealing tool rapidly so as to reduce the cycle time and maintain a high throughput of trays. Conventional lifting mechanisms are incapable of achieving this.

As already mentioned, the sealing tool is very heavy. Each tool is custom made for a specific shape and size of tray. Therefore, if a different shape or size of tray is to be sealed then the tool must be changed. This process is currently difficult because the tool must be manually lifted into position whilst retaining clamps are actuated. Obviously, there is a danger of injury to personnel or damage to the tool if it is dropped during installation.

Tray sealing machines are often used to package food products. These can spill from the trays when they are on the infeed conveyor system before sealing. It is therefore necessary to clean the infeed conveyor system after a packaging run. This is especially true if the next packaging run is for a different type of food product because it is vital to prevent any possibility of cross-contamination. However, to properly clean the infeed conveyor system it must be dismantled, and this can take an inordinately long length of time, reducing the duty cycle of machine operation, and requires the use of tools.

Often it is desired to replace the air in trays when they are sealed with another gas, such as nitrogen, carbon dioxide or air with a high oxygen content. This is done by drawing a vacuum over the trays and then supplying a gas just prior to sealing. However, the conventional process is inefficient both in terms of time and in terms of complete replacement of the air with another gas.

In accordance with a first aspect of the invention, there is provided a gripper assembly for a tray sealing machine, the gripper assembly comprising a carriage movable between extended and retracted positions; at least one gripper arm attached to the carriage and movable between gripping and releasing positions; and first and second independently operable drives separate from the carriage but coupled thereto via respective first and second drive train assemblies, wherein the first drive train assembly is adapted to move the carriage between the first and second positions in response to the operation of the first drive, and the second drive train assembly is further adapted to cause the at least one gripper arm to move between the open and closed positions in response to operation of the first and second drives at differing speeds.

Hence, the above mentioned problem is overcome by the provision of the two drive train assemblies, which allow for the two drives to be remotely located from the carriage. Thus, there is no need for service (e.g. air or electrical) connections to the carriage.

Movement of the carriage is carried out via the first drive and drive train assembly and opening and closing of the gripper arms is carried out via the second drive train assembly by operating the two drives at differing speeds.

In a preferred embodiment, the assembly comprises a pair of opposed gripper arms, each of which engages a respective one of two parallel rows of trays.

Typically, the first and second drives are servo motors.

The first drive train assembly normally comprises at least one belt driven by the first drive and fixed to the carriage. The or each belt is typically entrained between a respective drive pulley and a respective idler pulley.

Preferably, the drive train comprises two belts driven by the first drive and fixed to the carriage. In order to prevent the carriage from skewing as it is driven between the extended and retracted positions, each belt may be equally offset from the centre of the carriage.

Preferably, the belts are toothed belts to prevent slippage.

In a preferred embodiment, the or each drive pulley is mounted on a drive shaft driven by the first drive. The first drive train assembly typically comprises a drive belt coupling the first drive to the drive shaft.

In one embodiment, the second drive train assembly comprises a gripper arm actuation mechanism coupled to the at least one gripper arm via a drive member of a respective gripper arm linkage, the gripper arm actuation mechanism being adapted to convert rotary motion into movement of the at least one gripper arm between the open and closed positions.

The gripper arm actuation mechanism typically comprises a shaft mounted in the carriage and a gripper arm actuation pulley mounted on the shaft coupled to the second drive, a first end of the shaft being coupled to the gripper arm linkage.

The shaft may be provided with a universal joint between the first end and the gripper arm actuation pulley.

The gripper arm actuation pulley is normally coupled to the second drive via a gripper arm actuation belt entrained around a gripper arm drive pulley, an idler pulley and the gripper arm actuation pulley. Typically, the gripper arm drive pulley is driven by the second drive via a drive belt.

Preferably, the drive pulley is rotatably mounted on the abovementioned drive shaft driven by the first drive.

In a preferred embodiment, the first end of the shaft has a screw-threaded portion that engages with the drive member of the respective gripper arm linkage to cause the drive member to move along the shaft in response to rotation of the shaft, thereby causing the at least one gripper arm to move between the open and closed positions.

When the gripper assembly has two gripper arms, the second end of the shaft is coupled to the second of the pair of opposed gripper arms via a respective gripper arm linkage.

In this case, the second end of the shaft may have a screw-threaded portion, with an opposite sense to that at the first end of the shaft, that engages with the drive member of the respective gripper arm linkage to cause the drive member to move along the shaft in response to rotation of the shaft such that the two drive members move in opposite directions, thereby causing the two gripper arms to move between the open and closed positions.

The shaft may be provided with a universal joint between the second end and the gripper arm actuation pulley.

Preferably, the or each gripper arm linkage comprises two parallel arms, each of which is rotatably mounted on the carriage at one end and on a gripper arm carrier at the other end, the drive member being attached to one of the two arms so as to cause the two parallel arms to rotate relative to the carriage in response to rotation of the gripper arm actuation mechanism.

The gripper arms may be attached to the carriage by way of a pair of clamping plates forced together, in use, by a clamping mechanism.

The clamping mechanism typically comprises a lever with an eccentrically mounted cam that exerts a pressure on one of the clamping plates when the lever is in a closed position.

In a second aspect of the invention, there is provided a tray sealing machine comprising a tray sealing tool movable between a loading position and a sealing position, and a lifting mechanism comprising a linear actuator for moving a ram between extended and retracted positions; and a linkage to which the ram is attached, the linkage having a first arm coupled at one end to a base fixed to the tray sealing machine and to a second arm by way of a fulcrum, wherein the second arm is connected to at least one movable member constrained by a guide to move in a predetermined direction such that linear movement of the ram causes linear movement of the movable member relative to the base, thereby moving the tray sealing tool between the loading and sealing positions.

This linkage allows the sealing tool to be rapidly and smoothly raised and lowered thereby overcoming the problems inherent with the prior art.

The linear actuator may comprise a ball screw. In a preferred embodiment, the linear actuator is driven by a servo motor, which has been found to allow very smooth and controllable operation. For example, the speed of movement can be easily varied, both on the raising and lowering part of the cycle. The rest position of the sealing tool can be adjusted to suit sealing tool and tray variations.

Typically, the ram is attached to the first arm at a point on the other side of the fulcrum relative to the end coupled to the base.

In one embodiment, the or each movable member is a pillar.

Preferably, the or each pillar comprises a first end section and a second end section urged apart by a spring.

The or each pillar may advantageously comprise a gas inlet port for connection to the gas source, said gas inlet port being located in the first end section and being coupled through a gas supply channel within the pillar to a gas outlet port for coupling to the tray sealing tool, said gas outlet port being located in the second end section.

In a third aspect of the invention a method of loading a heat sealing tool into a tray sealing machine comprises:

a) positioning the heat sealing tool on a lift mechanism forming part of the tray sealing machine below its intended loaded position;

b) actuating the lift mechanism so as to raise the heat sealing tool towards its intended loaded position; and c) actuating a retaining mechanism when the heat sealing tool is in its intended loaded position so as to retain the heat sealing tool in its intended loaded position.

This method overcomes the danger to personnel and risk of damage to the heat sealing tool inherent in prior art methods by using the lift mechanism to bear the weight of the tool and load it in to its desired position.

Preferably, the method further comprises centralising the heat sealing tool with respect to its intended loaded position as it is raised in step (b), for example by engagement of one or more cone-shaped projections fitted to one of the heat sealing tool and the tray sealing machine with corresponding cone-shaped indentations in the other of the heat sealing tool and the tray sealing machine.

In a preferred embodiment, actuation of the retaining mechanism causes a pair of chamfers, one provided at each end of the heat sealing tool to engage with corresponding chamfers on the retaining mechanism, thereby retaining the heat sealing tool in the tray sealing machine.

Typically, one of the retaining mechanism and the heat sealing tool is provided with a projecting part that engages, on actuation of the retaining mechanism, with an indentation in the other of the retaining mechanism and the heat sealing tool so as to prevent lateral movement of the heat sealing tool with respect to the tray sealing machine.

The retaining mechanism may be pneumatically actuated.

Actuation of the retaining mechanism may also advantageously cause one or more service connections to be made to the heat sealing tool.

In a fourth aspect of the invention, there is provided a conveyor system comprising a support frame having a plurality of rollers about which an endless belt is entrained in use; the support frame being adapted to engage, in use, with a retaining mechanism and a locking mechanism mounted on a conveyor support, said retaining and locking mechanism cooperating to prevent removal of the conveyor system from the conveyor support when the locking mechanism is in a locked configuration but to allow removal of the conveyor system from the conveyor support when the locking mechanism is in an unlocked configuration, wherein the conveyor system further comprises a tensioning mechanism for automatically setting the tension of the endless belt when the conveyor system is in engagement with the conveyor support.

Hence, the conveyor system allows the support frame to be removed by simple operation of a locking mechanism allowing quick dismantlement and reassembly of the conveyor system. Therefore, cleaning can be more quickly carried out overcoming the problems inherent with the prior art.

An added advantage of the use of the tensioning mechanism is that when the support frame is removed from the conveyor support, the tension on the endless belt is automatically removed allowing it to be easily slipped off the support frame. This enhances the ease and speed with which cleaning may be performed.

Typically, the retaining mechanism comprises a pair of hooks, one on each side of the support frame, each hook engaging, in use, with a corresponding pin on the conveyor support.

Preferably, the locking mechanism comprises a quarter-turn device for selecting the locked and unlocked configurations by rotation through an angle of 90 degrees. In this case, the locking mechanism may comprise a bar provided with a shaped region, which is adapted to allow engagement with a hook on the support frame when the quarter-turn device is in the unlocked configuration and prevents disengagement of the hook when the quarter-turn device is in the locked configuration.

The endless belt is typically entrained around a tensioning roller that is movable relative to the support frame and is adapted to apply a tensioning force to the endless belt in use.

The tensioning force is normally applied by a spring coupled at one end to the support frame and to the tensioning roller at the other end.

In one embodiment, the tensioning roller is rotatably mounted between a pair of brackets that are slidably movable relative to the support frame.

In a fifth aspect of the invention, there is provided a heat sealing tool for use with a heat sealing machine adapted to feed trays for sealing to the heat sealing tool in two parallel rows, the heat sealing tool comprising a divider separating the two parallel rows, characterised in that the divider comprises one or more gas outlet ports through which gas can be supplied to replace any air in the trays before they are sealed.

This allows the gas to be supplied to one side of the trays whilst a vacuum is drawn from the opposite side, thereby improving the efficiency of gas replacement and overcoming the abovementioned problems.

The gas outlet ports are preferably joined via a manifold to one or more gas inlet ports in a base of the heat sealing tool.

Typically, the heat sealing tool is supported by one or more pillars, each of which comprises a gas inlet port for connection to a gas source, said gas inlet port being coupled through a gas supply channel which is in fluid communication with the gas inlet ports of the heat sealing tool.

An example of a tray sealing machine embodying the abovementioned aspects of the invention will now be described with reference to the accompanying drawings, in which:

FIG. 10 shows details of the gripper assembly drive train;

FIG. 11 shows details of the carriage;

FIG. 15 shows the upper part of the heat sealing tool before service connectors have been engaged to retain it in position in the tray sealing machine;

FIG. 16 shows the upper part of the heat sealing tool after service connectors have been engaged to retain it in position in the tray sealing machine;

Figure 1:
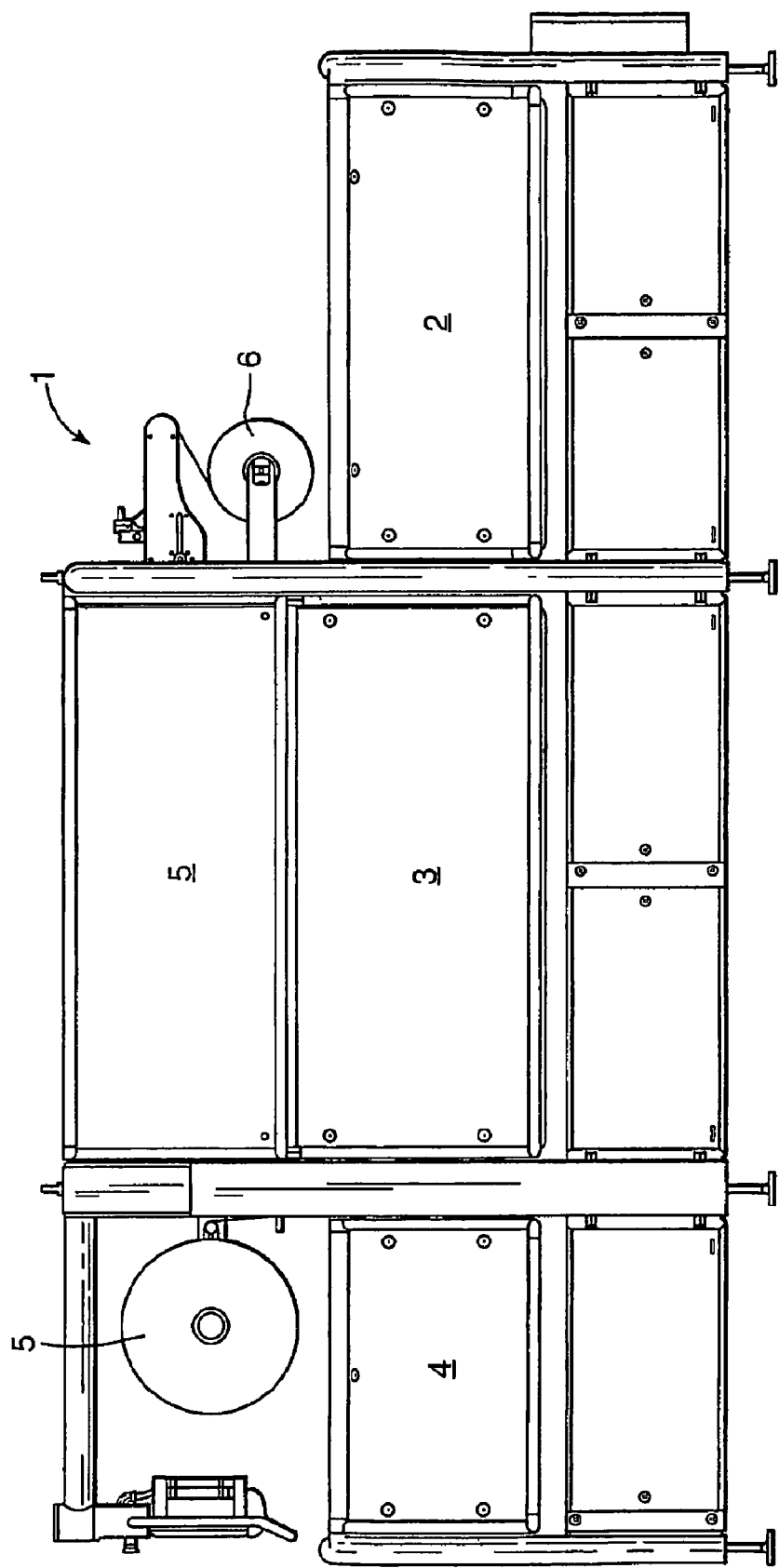
FIG. 1 shows a side view of the tray sealing machine.

FIG. 1 shows a tray sealing machine 1. The machine 1 has an infeed section 2, a sealing station 3 and an outfeed section 4. Trays to be sealed are collated on conveyors in the infeed section to form a group of trays. In this machine 1, the infeed section 2, sealing station 3 and outfeed section 4 are capable of handling two parallel rows of trays simultaneously. Thus, groups of trays are formed on two parallel infeed conveyors. The number of trays in each group depends on the number of trays that the sealing station can handle at one time.

When a group of trays has been collated on each of the parallel conveyors, a pair of opposed gripper arms engages the two groups of trays and draws them into the sealing station for sealing. At the same time the gripper arms engage trays that are already in the sealing station (and have therefore been sealed) and move them to the outfeed section 4 for onward conveyance. The gripper arms are suspended from a carriage that is located in the housing 5 above the sealing station 3.

Sealing is performed by application of pressure and heat to the trays and a film lid using a sealing tool located in the sealing station 3. Film for the lids is wound off a reel of film 6 into the sealing station. During sealing the film lies between two parts of the tool. The trays are brought into contact with the film by bringing the two parts together and then heat is applied to fuse the film to the trays. The film is then cut around the periphery of the trays before the two parts of the tool are separated to allow the sealed trays to be dispatched to the outfeed section 4. Surplus film is wound onto a rewind spool 6.

Figure 2:
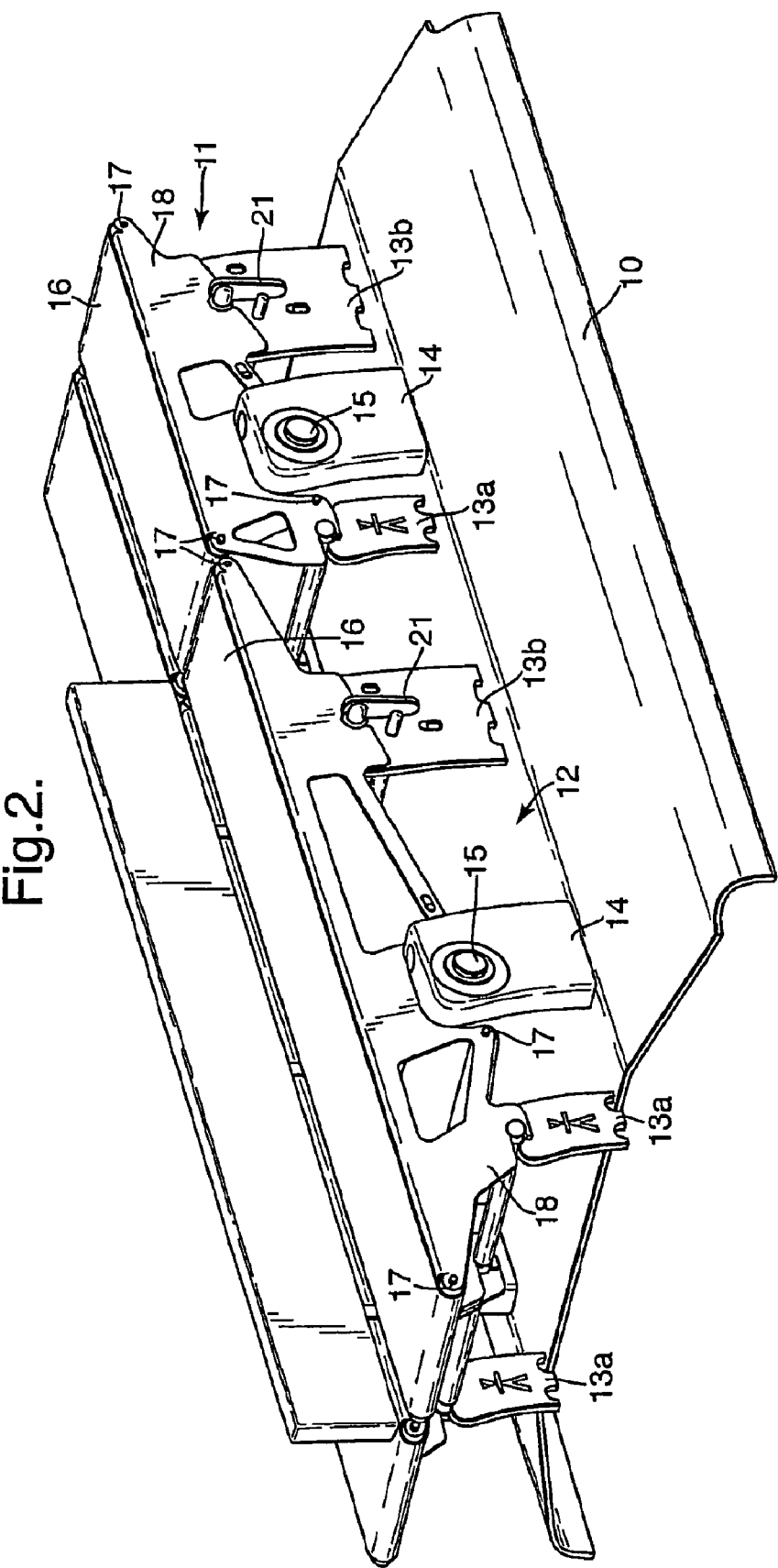
FIG. 2 shows an infeed conveyor system forming part of the tray sealing machine.

FIG. 2 shows part of the infeed section 2, specifically the conveyors making up the two parallel conveying paths for the parallel rows of trays. Only one of these conveying paths will be described, the other simply being a mirror image.

A base plate 10 supports two conveyor units, an infeed conveyor 11 and a collating conveyor 12. The groups of trays are collated on the collating conveyor 12. In operation, the infeed conveyor 11 is driven continuously until a complete group of trays has been formed on the collating conveyor 12. As each tray reaches the downstream end of infeed conveyor 11 it is sensed by an optical sensor (not shown), which triggers the operation of collating conveyor 12 at the same speed as infeed conveyor 11 for a predetermined length of time depending on the tray length.

The trays are therefore spaced apart on the collating conveyor 12 by a predetermined pitch so that the gripper arm can engage them. When the group is formed on the collating conveyor 12, the infeed conveyor 11 is stopped until the gripper arm has drawn the trays into the sealing station when the next group is formed.

The structures of the infeed conveyor 11 and collating conveyor 12 are substantively the same, the only material difference being in their length. Each is mounted on conveyor supports 13a and 13b. Drive to each of the infeed conveyor 11 and collating conveyor 12 is supplied from a respective motor (not shown), housed beneath the base plate 10, via a drive train (not shown) passing through the base plate 10 into housing 14 where it engages a roller 15. Each roller 15 frictionally engages a respective endless belt 16 when the infeed conveyor 11 and collating conveyor 12 are fixed to the conveyor supports 13a and 13b.

Each endless belt 16 is entrained around rollers 17 rotatably mounted to a support frame comprising a pair of opposed side plates 18 and around a tensioning roller 25.

Figure 3:
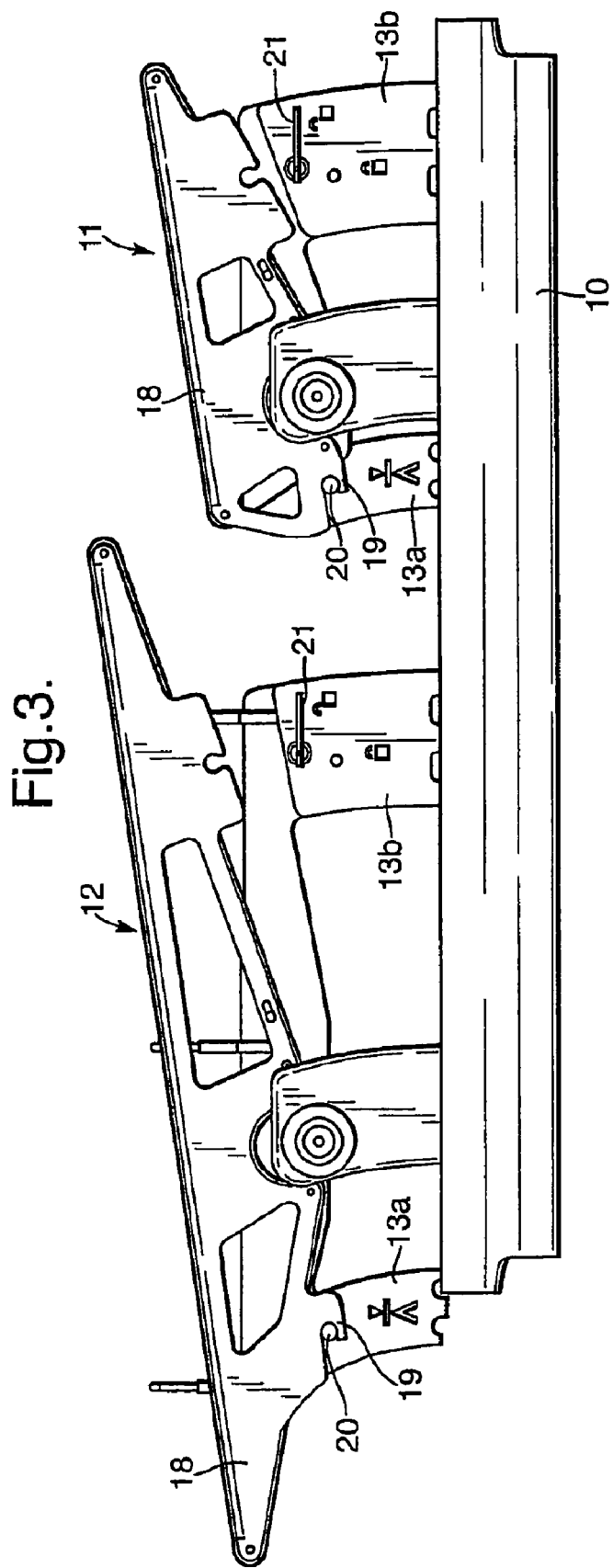
FIG. 3 shows the conveyors being removed from their supports.
Figure 4:
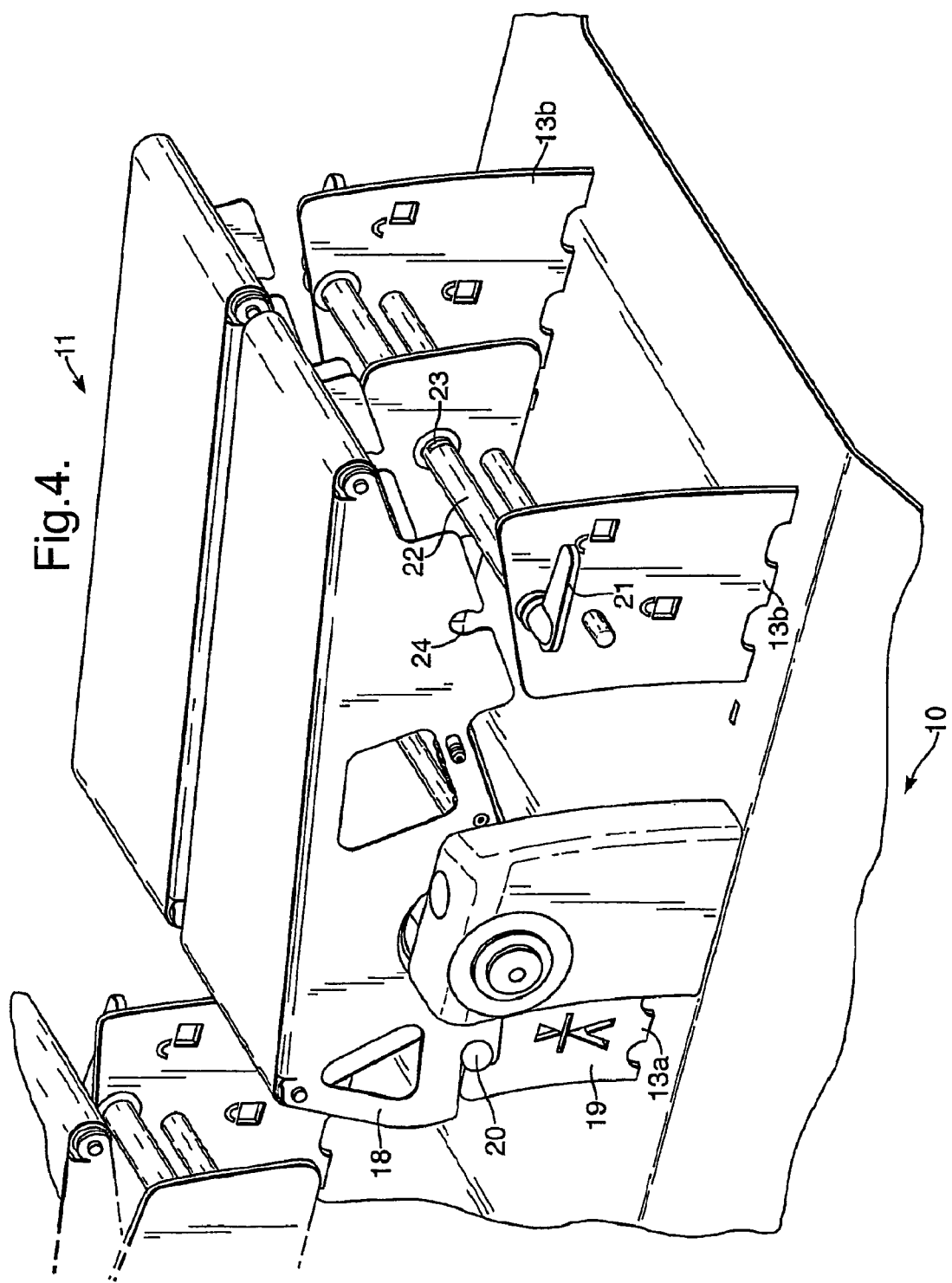
FIG. 4 shows details of a locking mechanism for the conveyors.

FIGS. 3 and 4 show details of a quick-release locking mechanism that can be used to release the infeed conveyor 11 and collating conveyor 12 for cleaning. The downstream end of each side plate 18 has a hook 19, which engages with a pin 20 attached to the supports 13a.

A locking lever 21 is connected to a locking bar 22 extending between supports 13b. The locking lever 21 may be rotated from a locked position (as in FIG. 2) through 90 degrees to an unlocked position (as shown in FIGS. 3 and 4). When in the unlocked position, flattened portions 23 of locking bar 22 allow hooks 24 in the side plates 18 to disengage from the locking bar 22 so that the upstream end of the conveyor may be rotated upwardly away from base plate 10 as shown in FIGS. 3 and 4. The hooks 19 may then be disengaged from pins 20. When in the locked position, hooks 24 cannot be disengaged from the locking bar due to the shape in the flattened portions 23 and the conveyor is retained on the supports 13a and 13b.

Figure 5:
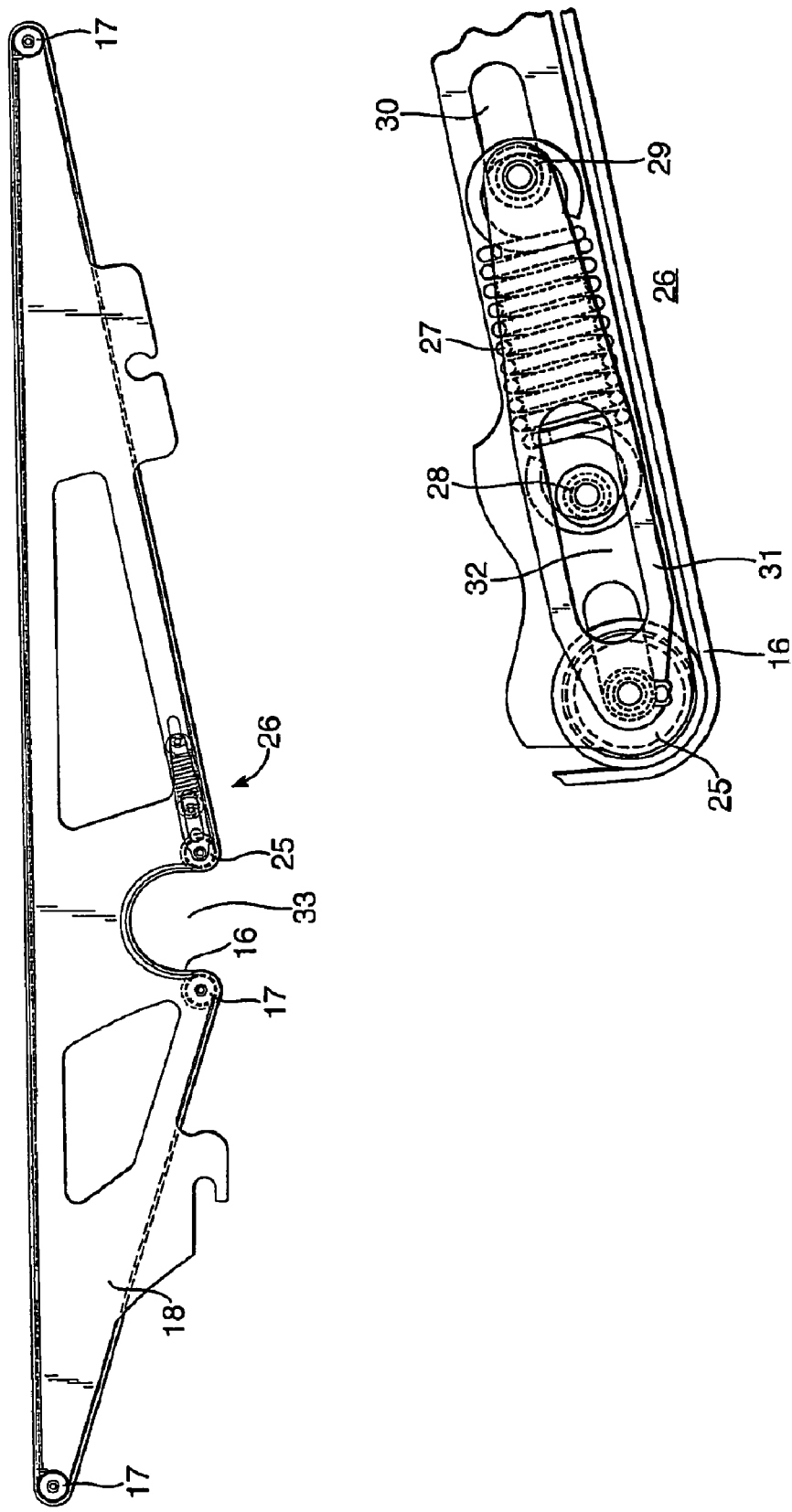
FIG. 5 shows details of a tensioning system for the conveyors.
Figure 6:
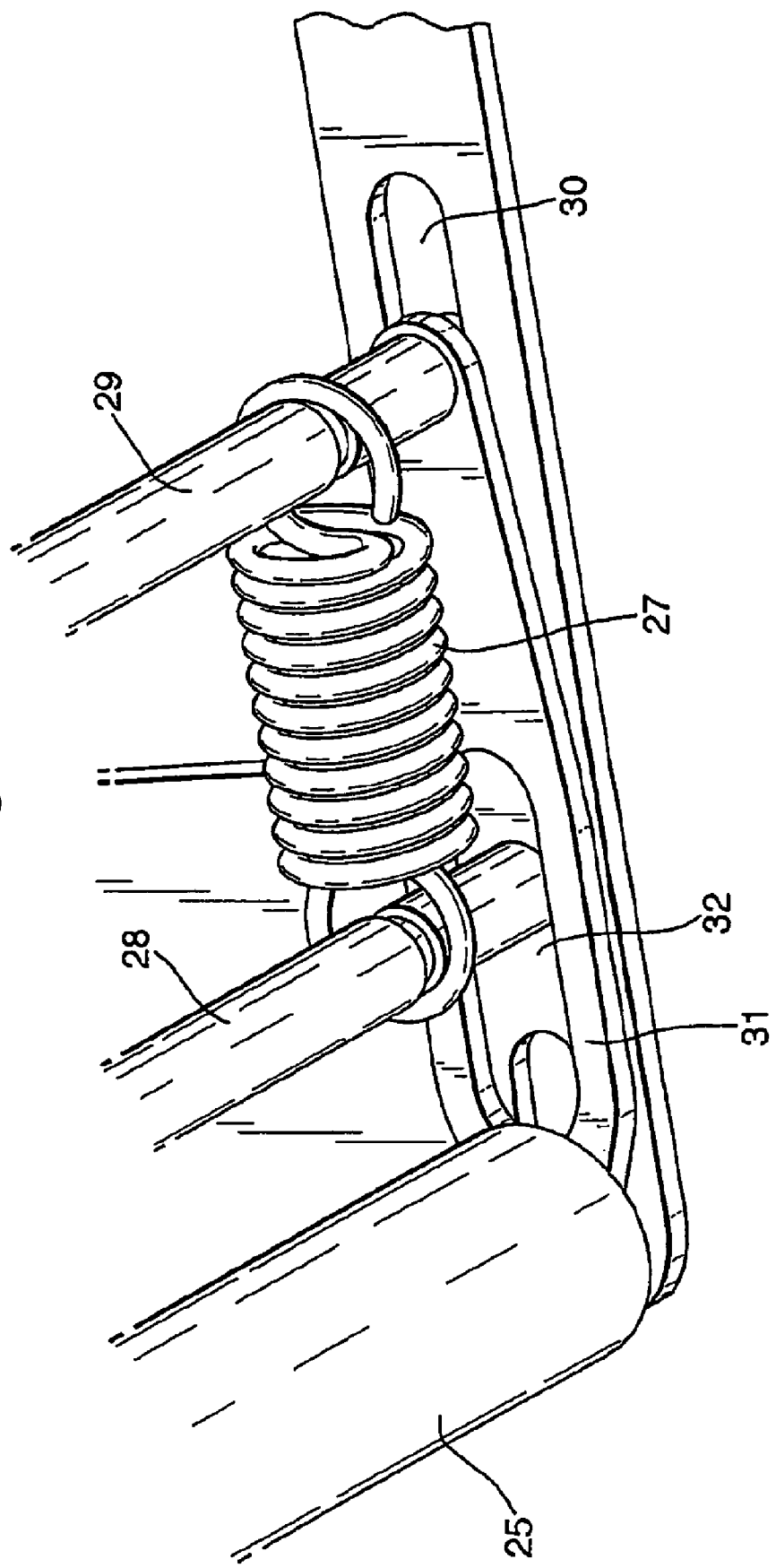
FIG. 6 shows a closer view of the tensioning system for the conveyors.

FIGS. 5 and 6 show details of an automatic tensioning system 26 that operates to correctly tension the belt 16 when the conveyor is fitted to the supports 13a and 13b. The tensioning system 26 comprises a pair of springs 27 (one adjacent each side plate 18, but only one shown for clarity) attached at one end to fixed supports 28 attached to the side plates 18 and at the other end to a bar 29 slidably mounted in slots 30 in side plates 18. A pair of brackets 31 is attached to bar 29. Tensioning roller 25 is rotatably mounted between the other ends of the pair of brackets 31. Slots 32 in the brackets 31 allow them to slide over supports 28. The springs 27 force tensioning roller 25 into region 33 in which roller 15 is located when the conveyor is fitted. The tensioning roller 25 therefore tensions belt 16.

When the conveyor is not fitted, the belt 16 does not wrap around roller 15 so the tensioning roller 25 cannot tension the belt 16. The belt 16 is therefore slack and can be easily removed for cleaning.

Figure 7A:
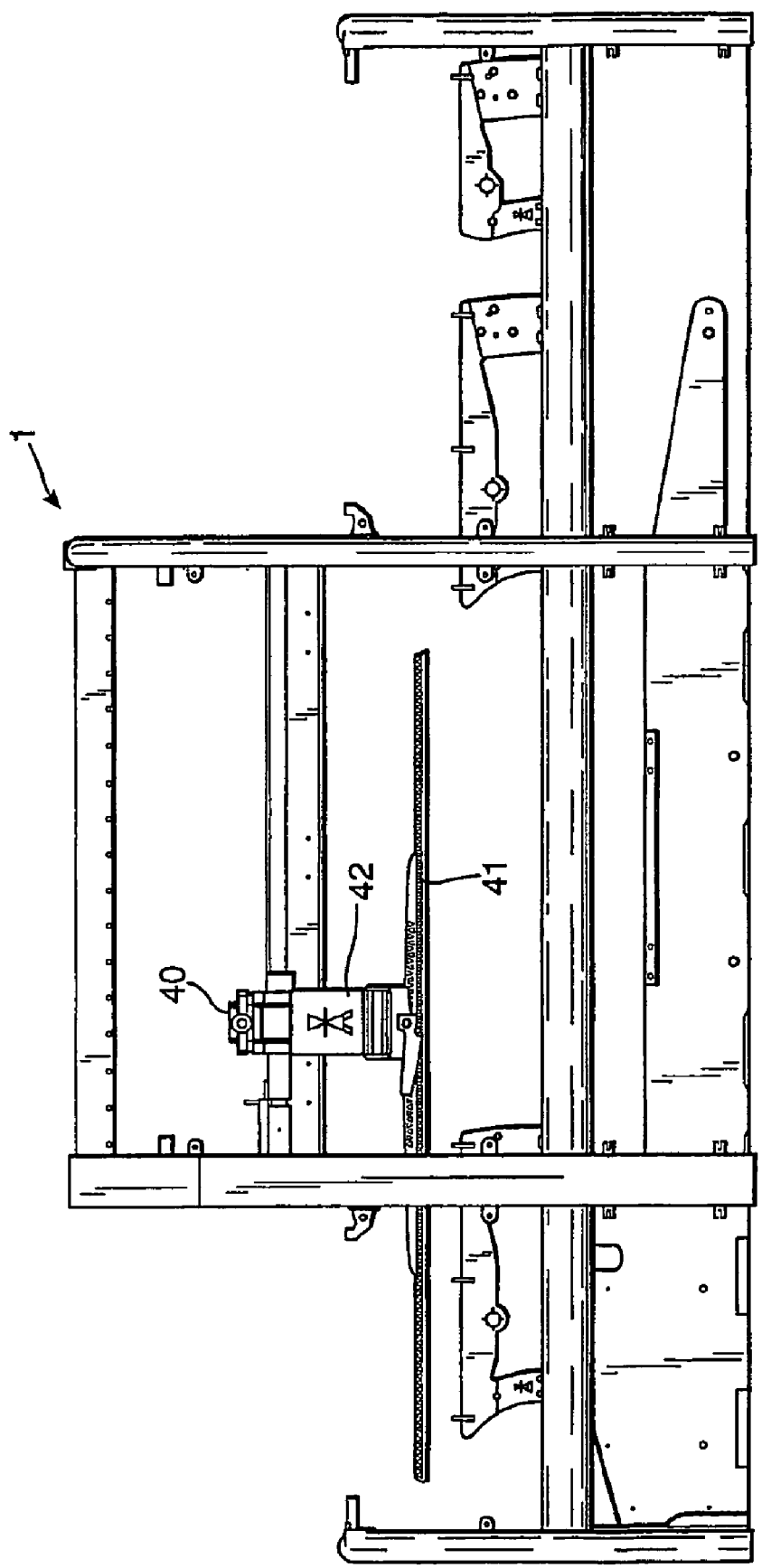
FIGS. 7a and 7b show a side view of the tray sealing machine with various parts removed to expose the gripper assembly.
Figure 7B:
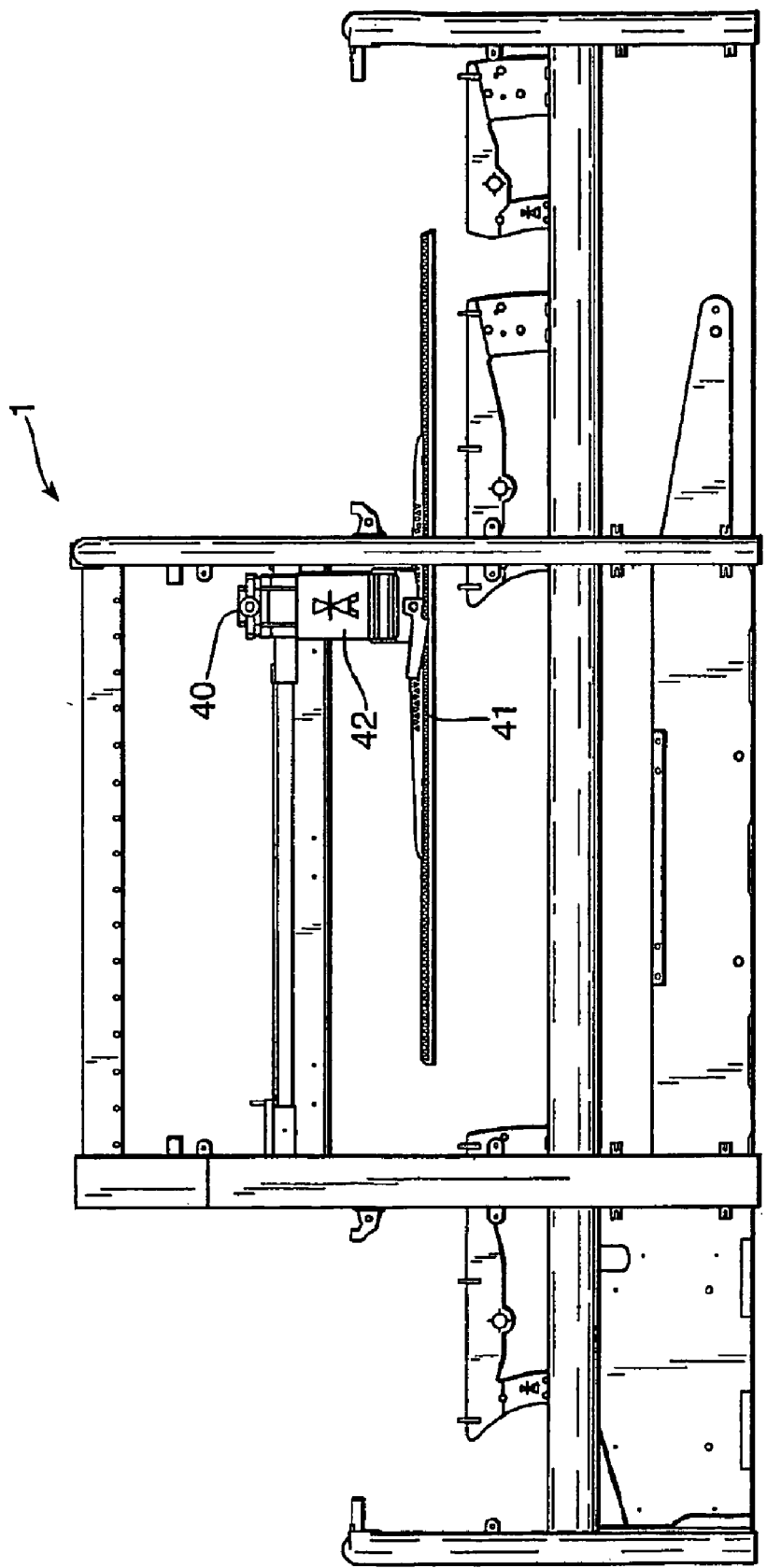

FIGS. 7a and 7b show a side view of the tray sealing machine 1 with various parts removed to clearly show the gripper assembly. The gripper assembly comprises a carriage 40 from which a pair of gripper arms 41 (one for each of the parallel conveyor sections) is suspended via a respective linkage 42. FIG. 7b shows the gripper arms 41 in the advanced position where the rightmost part of the gripper arms 41 can engage trays on the collating conveyor 12 whilst the leftmost part of the gripper arms 41 can engage trays already in the sealing station 3. The gripper arms 41 may then be moved to the retracted position shown in FIG. 7a whereby trays are moved from the collating conveyor 12 to the sealing station 3 and from the sealing station 3 to the outfeed section 4.

Figure 8:
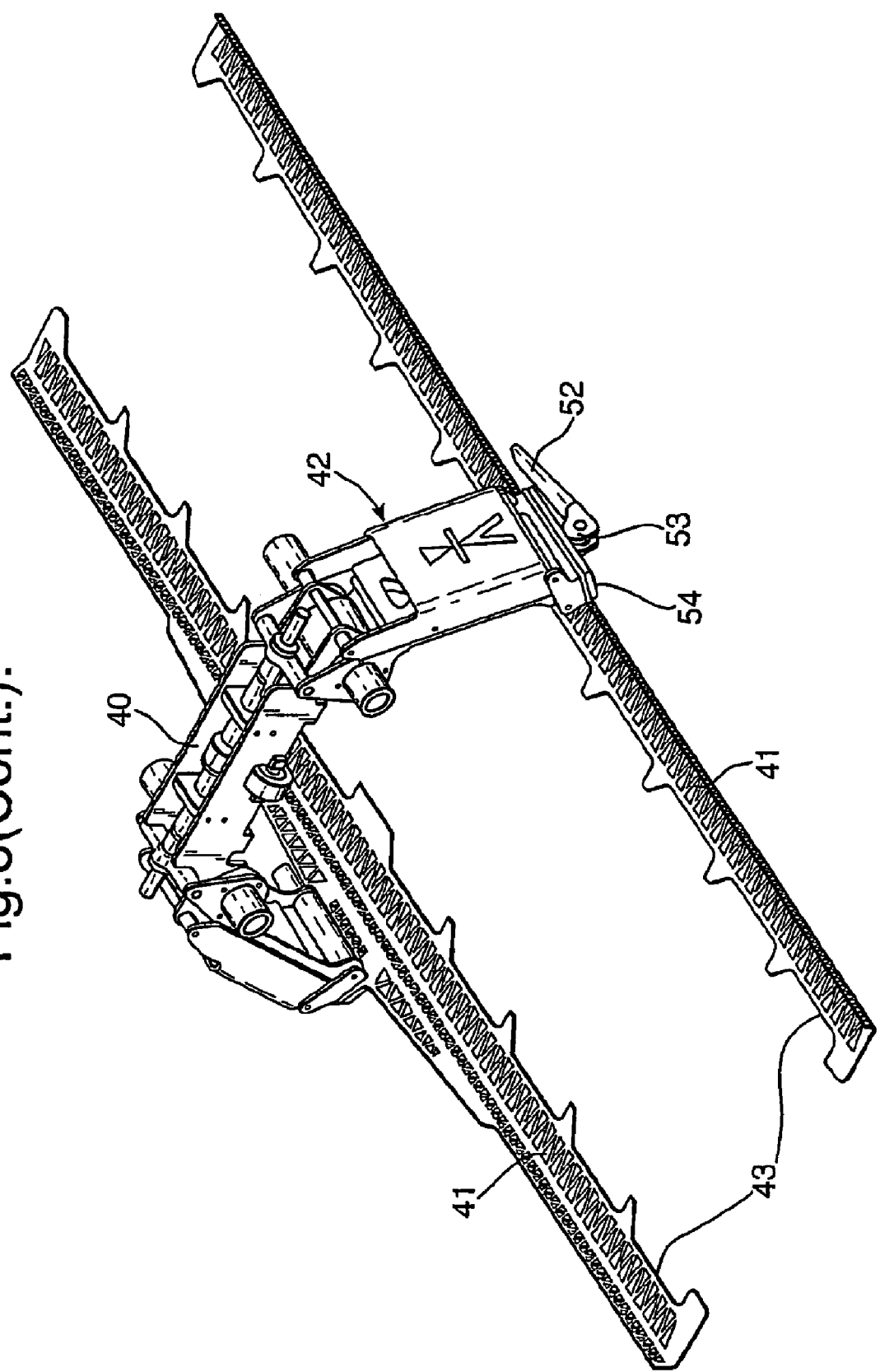
FIG. 8 shows details of a gripper carriage and gripper arms in their open configuration.
Figure 9:
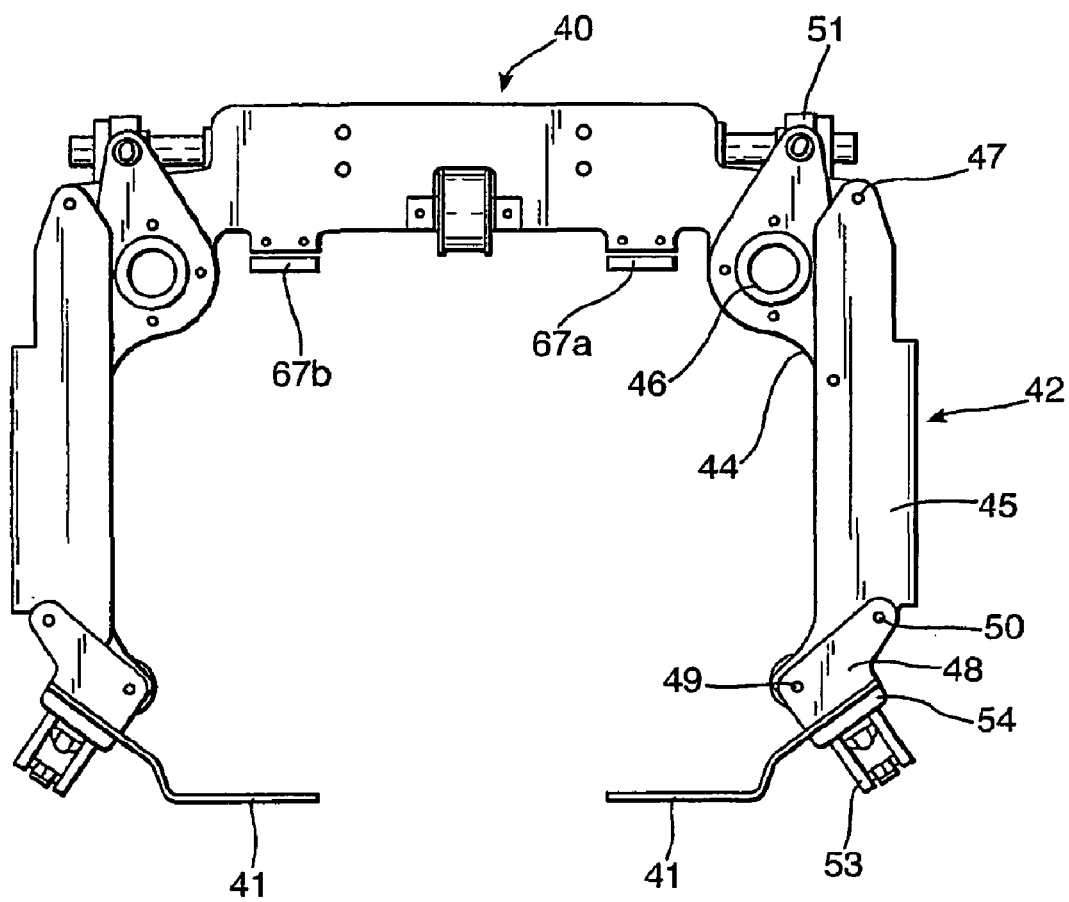
FIG. 9 shows details of the carriage and gripper arms in their closed configuration.

FIGS. 8 and 9 show the gripper arms 41 in their open and closed positions respectively. In the closed position the gripper arms 41 engage trays in the indentations 43 spaced along the gripper arms 41. In the open positions the gripper arms 41 disengage from the trays and release them.

As can be seen from FIGS. 8 and 9, each linkage 42 comprises a pair of parallel arms 44 and 45. Parallel arms 44 and 45 are rotatably attached to carriage 40 via bearings 46 and 47 respectively. Similarly the lower ends of parallel arms 44 and 45 are rotatably attached to end member 48 via bearings 49 and 50 respectively. This linkage ensures that end member 48 always remains at the same angle relative to the longitudinal axis of carriage 40 as arms 44 and 45 rotate. Therefore, gripper arms 41 remain horizontal as shown in FIGS. 8 and 9.

The parallel arms 44 and 45 are caused to rotate so as to move the gripper arms 41 between the open and closed positions by linear drive imparted to drive member 51 attached to arm 44. This will be described in more detail later.

Also shown in FIGS. 8 and 9 are quick-release levers 52, which have an eccentrically-mounted cam section 53 that applies a clamping force to clamping plate 54 when in the position shown, thereby clamping the gripper arm 41 between the clamping plate 54 and end member 48. Clockwise rotation of lever 52 will rotate cam section 53 so that it no longer applies the clamping force, thereby allowing removal of the gripper arm 41.

FIG. 10 shows details of the drive train assembly for operating the gripper arms 41 and moving the carriage 40. The drive train assembly comprises first and second independently operable drive motors (not shown) located in housing 60.

The first motor is for moving the carriage 40 between the advanced and retracted positions. It is coupled via a toothed drive belt 61 to a pulley 62 mounted on drive shaft 63. Drive from the first motor is coupled through drive shaft 63 to a pair of pulleys 64a and 64b. A respective one of toothed belts 65a and 65b is entrained around each of pulleys 64a and 64b and a corresponding one of idler pulleys 66a and 66b. The toothed belts 65a and 65b are attached to the carriage 40 by way of clamps 67a and 67b respectively (see FIGS. 8 and 9). Thus, rotation of the first motor causes rotation of the drive shaft 63, which is coupled to carriage 40 via the toothed belts 65a and 65b.

The second motor drives a pulley 68 via toothed drive belt 69. Pulley 68 is mounted on drive shaft 63, but can freely rotate relative to it. Pulley 68 is also coupled to toothed belt 70, which is entrained around an idler pulley 71 and a pulley system on the carriage 40.

This pulley system comprises two idler pulleys 72a and 72b mounted on the underside of carriage 40 and a gripper arm actuation pulley 73 mounted on shaft 74, which is rotatably mounted to carriage 40.

The effect of this arrangement is that shaft 74 will only rotate when toothed belt 70 is running at a different speed to that of toothed belts 65a and 65b. If all three toothed belts 70, 65a and 65b are running at the same speed then the toothed belt 70 and the carriage 40 are moving at the same speed and shaft 74 cannot rotate.

As will be explained below, rotation of shaft 74 causes the gripper arms 41 to move between the open and closed positions. Therefore, the gripper arms 41 are actuated simply by operating the second motor without operating the first motor. The carriage is moved between the extended and retracted positions by operating both motors at the same speed so that the carriage 40 moves but shaft 74 does not rotate.

Shaft 74 is coupled via a pair of universal joints 75a and 75b to screw-threaded portions 76a and 76b, each of which engages with an internal screw thread in a respective drive member 51 connected to one of parallel arms 44. The screw-threads screw-threaded portions 76a and 76b are cut in opposite senses. Thus, as shaft 74 rotates, the drive members 51 are driven in opposite linear directions, either towards each other or apart, thereby either opening or closing the gripper arms 41. The universal joints 75a and 75b allow for an element of vertical motion of drive members 51 as they move together or apart.

The heat sealing tool that is used to fuse the film lids to the trays is in two parts, an upper part firmly held in the sealing station 3 just beneath the carriage 40 and a lower part that is raised and lowered on a lifting mechanism. When in the lowered position, the trays can be loaded onto the lower part of the tool by gripper arms 41. The lifting mechanism then raises the lower part to meet the upper part, thereby clamping the trays and film lid whilst heat is applied.

Figure 12:
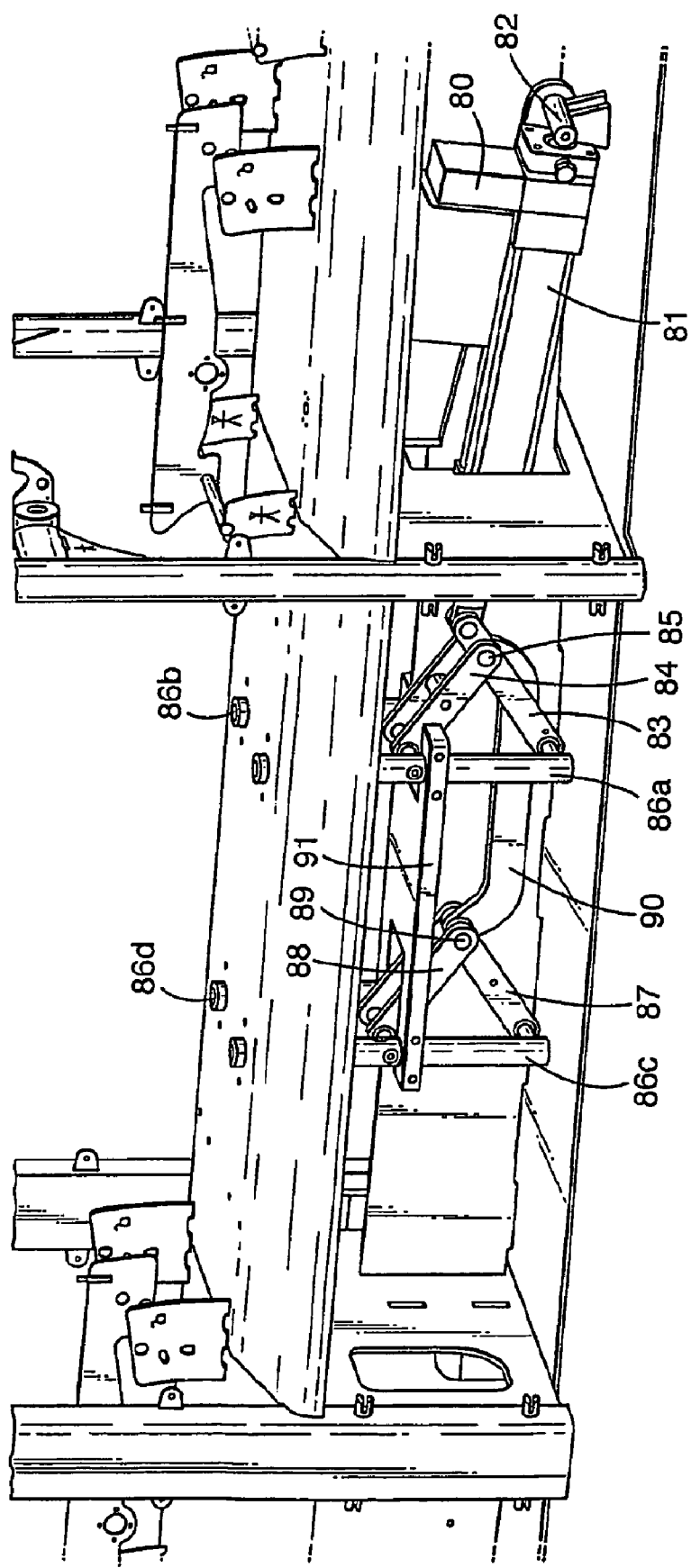
FIG. 12 shows a lifting mechanism used to raise and lower the heat sealing tool.

FIG. 12 shows a lifting mechanism, which can be used to raise and lower the lower part of the heat sealing tool. The lifting mechanism is driven by a servo motor 80, which is connected to a ball screw 81 to provide a linear actuator. The servo motor 80 and ball screw 81 are mounted to the tray sealing machine 1 by way of a fulcrum 82, which allows them to rotate slightly as is necessary when the tool is raised and lowered.

The ball screw 81 is connected to one arm 83 of a linkage, which is rigidly fixed to the machine 1 at its lower end and connected to one end of another arm 84 by way of fulcrum 85. The other end of arm 84 is connected to a pair of pillars 86a and 86b.

A similar linkage is formed of arms 87 and 88 joined at fulcrum 89. The two fulcrums 82 and 89 are joined by way of a rigid tie bar 90. The top end of arm 88 is connected to pillars 86c and 86d.

By way of these linkages and guide member 90 through which pillars 86a to 86d pass, linear motion of the ball screw 81 is converted to linear, vertical motion of the pillars 86a to 86d. The lower part of the tool is mounted on these pillars in use and can therefore be raised and lowered by actuation of servo motor 80.

Figure 13:
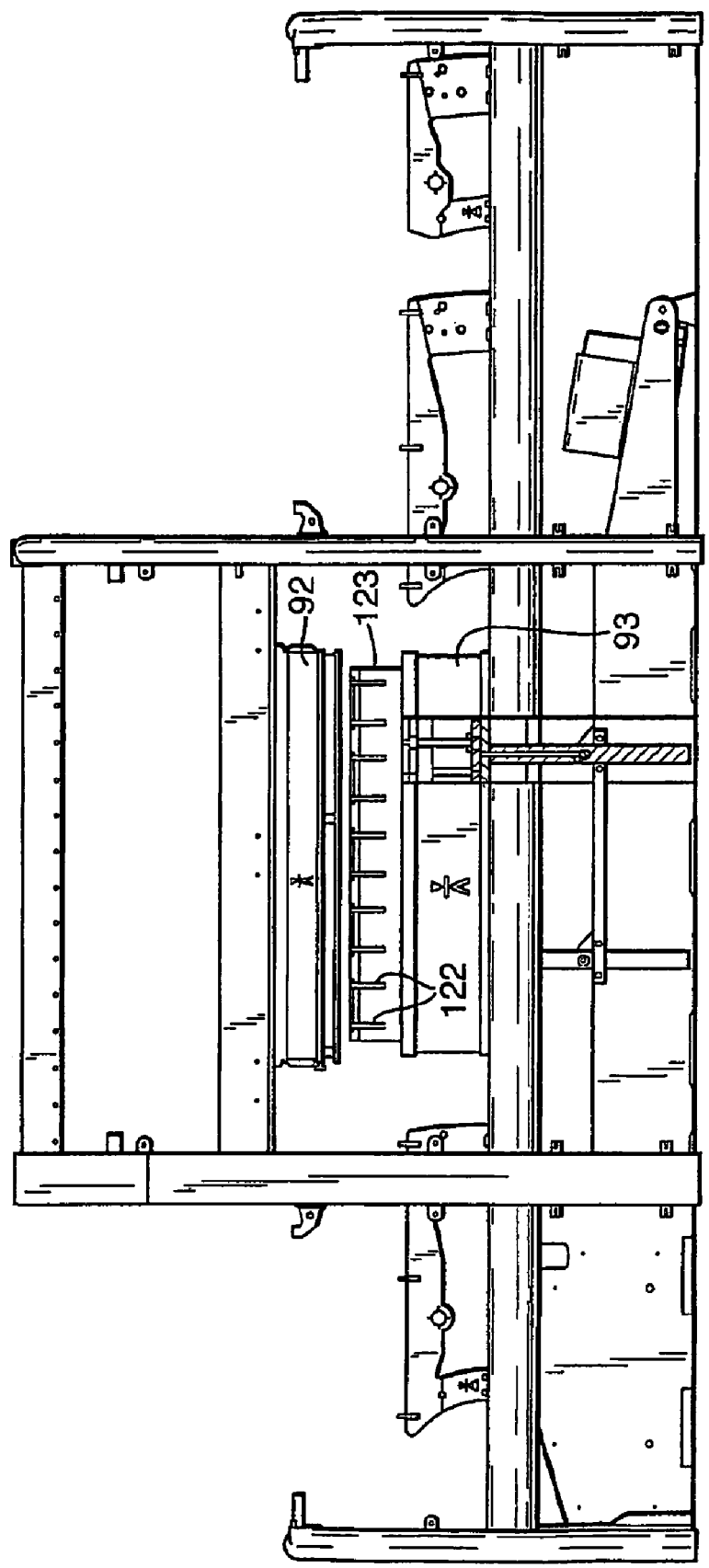
FIG. 13 shows the upper and lower parts of the heat sealing tool in their open configuration.
Figure 14:
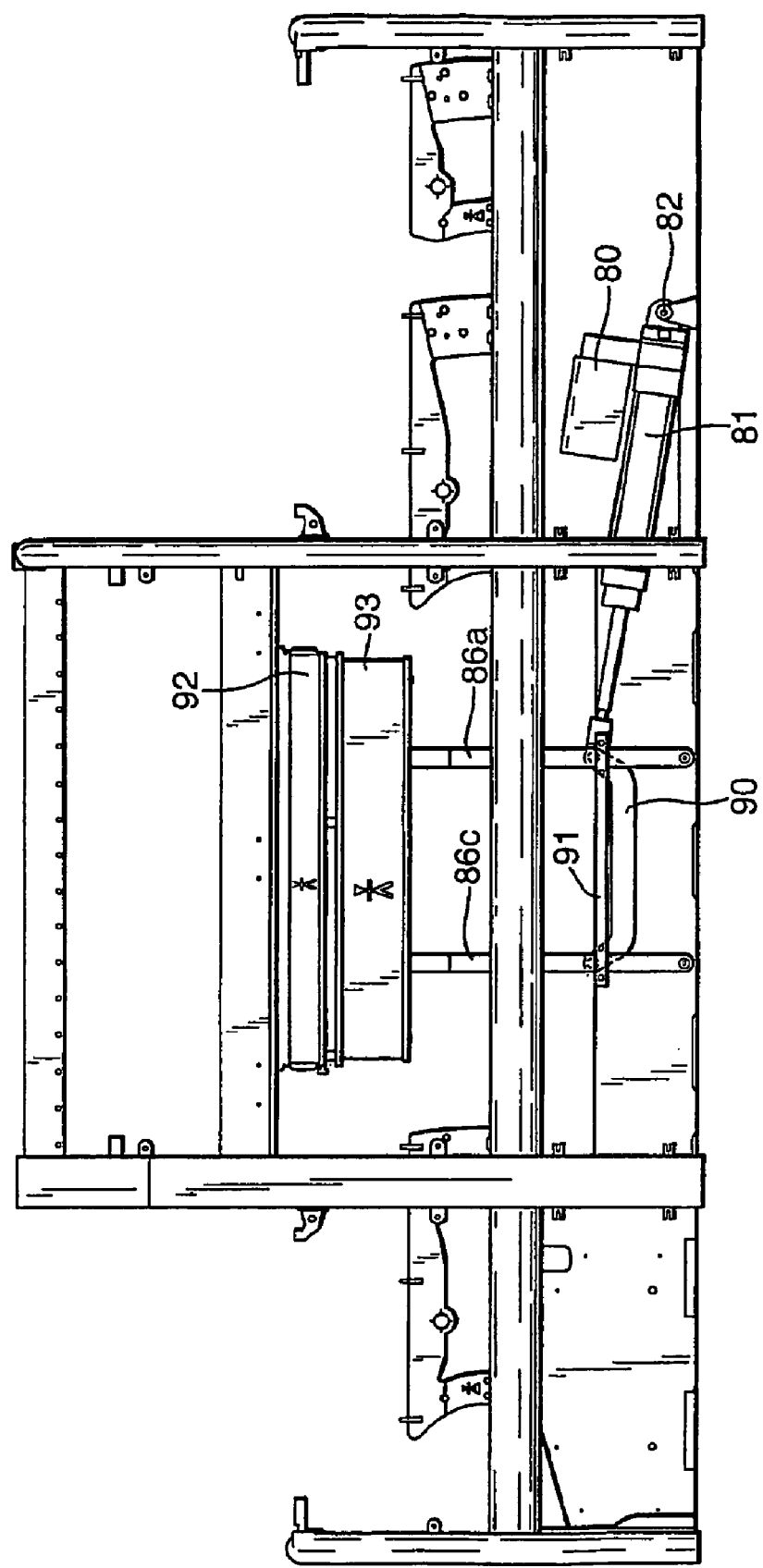
FIG. 14 shows the upper and lower parts of the heat sealing tool in their closed configuration.

FIGS. 13 and 14 show the machine 1 with upper 92 and lower 93 parts of the tool installed in open and closed positions respectively.

It is a common requirement to change the tools for reasons already discussed. The lifting mechanism just described can be used to assist this operation. In order to install a new tool, the upper 92 and lower 93 parts are brought to the machine 1 on a special-purpose, tool loading trolley with the two parts 92 and 93 together as shown in FIG. 14. The two parts 92 and 93 are then held over the lifting mechanism, which is raised so as to engage the lower part 93 and bear the weight of both the lower part 93 and upper part 92. These two parts 92 and 93 are then raised on the lifting mechanism until the upper part is in the correct position for installation.

As the upper part 92 is raised, a cone on support plate 95 engages with a corresponding recess on upper part 92. This ensures that the upper part 92 is correctly centralised in the machine 1.

The upper part 92 is shown in the installation position in FIG. 15. In order to retain the upper part 92 in this position, a pair of service connectors 94a and 94b are brought together so as to engage with the ends of upper part 92. The service connectors 94a and 94b are brought together and apart by operation of pneumatic cylinders 96a and 96b connected to service connector mounting brackets 97a and 97b respectively.

The service connectors 94a and 94b provide electrical power (for heating) along with other services which may be required in the sealing process by the upper part 92 such as a vacuum connection, cooling water, a pneumatic air supply, a pressure measurement connection and a gas sampling connection.

As the service connectors 94a and 94b engage with upper part 92, projections 98 engage with corresponding recesses in upper part 92 to prevent lateral movement after installation in the machine 1. A pair of chamfers 99a and 99b on the service connectors 94a and 94b engage with corresponding chamfers 100a and 100b on the upper part to hold the upper part 92 against the support plate 95. By use of chamfers 99a, 99b and 100a, 100b slight deviations in the vertical alignment of the upper part 92 relative to the machine 1 before the service connectors 94a and 94b are engaged can be tolerated.

Figure 17:
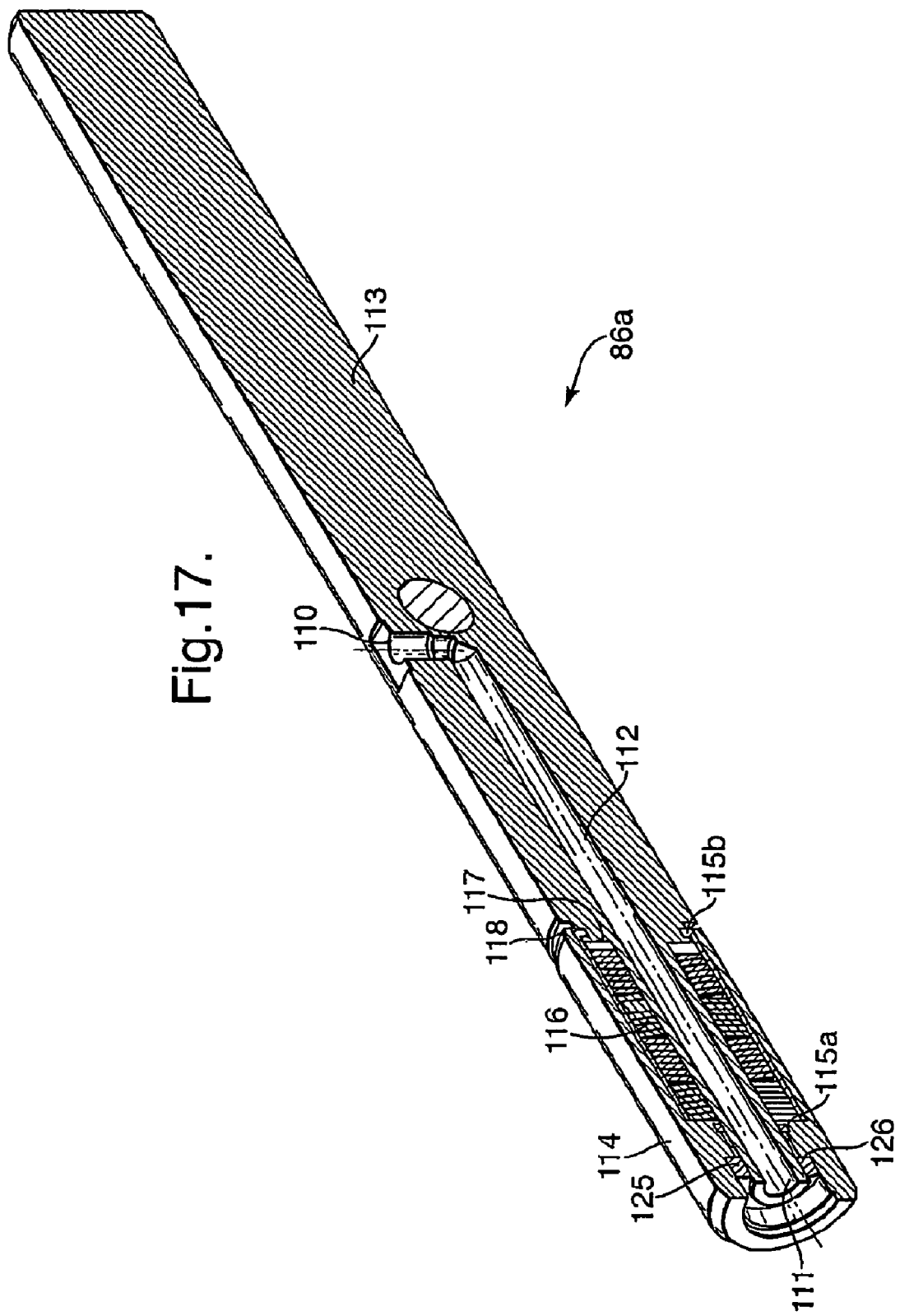
FIG. 17 shows a cross-section through one of the pillars used to support the lower part of the heat sealing tool.

FIG. 17 shows a cross-section through pillar 86a. The other three pillars 86b to 86d are identical. As has been mentioned previously, it is often desired to replace the air in the trays with another gas before sealing. The gas can be supplied to the lower part 93 of the sealing tool via the pillars 86a to 86d. The gas supply is connected to a gas inlet port 110, which is in communication with a gas outlet port 111 at the top of the pillar via a gas supply channel 112. The gas supplied via the gas inlet port 110 thus follows the path shown in FIG. 17 by the broken line. The distribution of gas within the lower part 93 of the sealing tool will be describe later with reference to FIG. 18.

As can be seen in FIG. 17, the pillar 86a comprises a lower section 113 and an upper section 114. The lower section 113 extends through the upper section 114 to provide the gas supply channel 112. A pair of o-rings 115a and 115b provides a gas seal between the lower section 113 and the upper section 114. A spring 116 fits within a recess in the upper section 114 and bears against a shoulder 117 on lower section 113. The spring 116 thus urges the upper section 114 and lower section 113 apart, but the extent of the separation between the upper and lower sections 114 and 113 is restricted by an end cap 125 held on lower section 113 by a circlip (not shown) which bears against a shoulder 126 on upper section 114. The spring 116 therefore provides a gap 118 (typically of 3 mm) between the upper and lower sections 114 and 113. The existence of this gap 118 and the spring 117 in all four pillars 86a to 86d allows any slight misalignment in the upper and lower parts 92 and 93 of the tool to be automatically compensated as they are brought together for sealing.

As will be appreciated, although the pillars 86a to 86d are only shown herein in use with the linkage described above and shown in FIG. 12, their use is more general, and the advantages of the spring 116 and the gas channel may be used with any other type of lifting mechanism.

Figure 18:
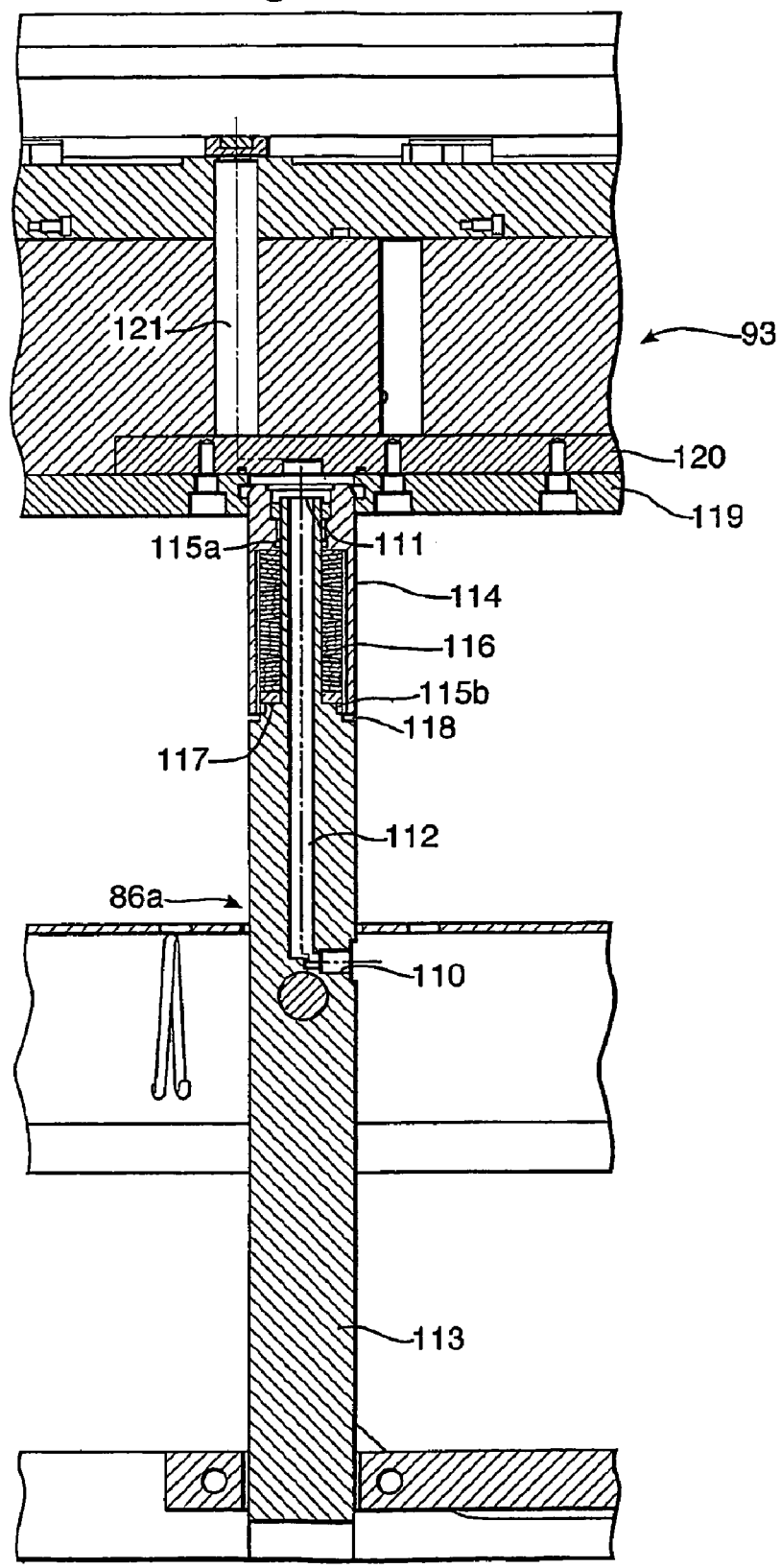
FIG. 18 shows details of a gas supply path through one of the pillars and part of the lower part of the heat sealing tool.

FIG. 18 shows pillar 86a and part of the lower part 93 of the sealing tool in cross-section. Pillar 86a fits into a recess in base plate 119 in lower part 93. An o-ring (not shown) in the recess in base plate 119 makes a gas-tight seal against the outer diameter of upper section 114 of pillar 86a. Upper section 114 is provided with a chamfer at its top end as a means of guiding it into the o-ring and to prevent damage to the o-ring on insertion.

Base plate 119 provides for fluid communication between the outlet port 111 on pillar 86a and a manifold 120, which provides a channel connecting each pillar 86a to 86d with each of ten central gas channels 121. Each gas channels 121 is in fluid communication with a respective gas outlet 122 provided in a central divider 123 (shown in FIG. 13). The central divider 123 lies between the two parallel rows of trays during sealing and therefore allows gas to be provided to both rows simultaneously. At the same time, a vacuum is normally drawn during sealing across the trays by vacuum ports provided in the outer edges of upper part 92 of the sealing tool.

The invention claimed is:

1. A gripper assembly for a tray sealing machine, the gripper assembly comprising: a carriage movable between extended and retracted positions; at least one gripper arm attached to the carriage and movable between gripping and releasing positions; and first and second independently operable drives separate from the carriage but coupled thereto via respective first and second drive train assemblies, wherein the first drive train assembly is adapted to move the carriage between the first and second positions in response to the operation of the first drive, and the second drive train assembly is further adapted to cause the at least one gripper arm to move between the open and closed positions in response to operation of the first and second drives at differing speeds, wherein the second drive train assembly comprises a gripper arm actuation mechanism coupled to the at least one gripper arm via a drive member of a respective gripper arm linkage, the gripper arm actuation mechanism being adapted to convert rotary motion into movement of the at least one gripper arm between the open and closed positions.

2. A gripper assembly according to claim 1, wherein the gripper arm actuation mechanism comprises a shaft mounted in the carriage and a gripper arm actuation pulley mounted on the shaft coupled to the second drive, a first end of the shaft being coupled to the gripper arm linkage.

3. A gripper assembly according to claim 2, wherein the shaft is provided with a universal joint between the first end and the gripper arm actuation pulley.

4. A gripper assembly according to claim 2, wherein the gripper arm actuation pulley is coupled to the second drive via a gripper arm actuation belt entrained around a gripper arm drive pulley, an idler pulley and the gripper arm actuation pulley.

5. A gripper assembly according to claim 4, wherein the gripper arm drive pulley is driven by the second drive via a drive belt.

6. A gripper assembly according to claim 4 when each drive pulley is mounted on a drive shaft driven by the first drive, wherein the drive pulley is rotatably mounted on the drive shaft.

7. A gripper assembly according to claim 2, wherein the first end of the shaft has a screw-threaded portion that engages with the drive member of the respective gripper arm linkage to cause the drive member to move along the shaft in response to rotation of the shaft, thereby causing the at least one gripper arm to move between the open and closed positions.

8. A gripper assembly according to claim 2, when the assembly comprises a pair of opposed gripper arms, each of which engages a respective one of two parallel rows of trays, wherein the second end of the shaft is coupled to the second of the pair of opposed gripper arms via a respective gripper arm linkage.

9. A gripper assembly according to claim 8, wherein the first end of the shaft has a screw-threaded portion that engages with the drive member of the respective gripper arm linkage to cause the drive member to move along the shaft in response to rotation of the shaft, thereby causing the at least one gripper arm to move between the open and closed positions, wherein the second end of the shaft has a screw-threaded portion, with an opposite sense to that at the first end of the shaft, that engages with the drive member of the respective gripper arm linkage to cause the drive member to move along the shaft in response to rotation of the shaft such that the two drive members move in opposite directions, thereby causing the two gripper arms to move between the open and closed positions.

10. A gripper assembly according to claim 9, wherein the shaft is provided with a universal joint between the second end and the gripper arm actuation pulley.

11. A gripper assembly according to claim 1, wherein each gripper arm linkage comprises two parallel arms, each of which is rotatably mounted on the carriage at one end and on a gripper arm carrier at the other end, the drive member being attached to one of the two arms so as to cause the two parallel arms to rotate relative to the carriage in response to rotation of the gripper arm actuation mechanism.

* * * * *